US009296917B2

(12) United States Patent
Misev et al.

(10) Patent No.: US 9,296,917 B2
(45) Date of Patent: *Mar. 29, 2016

(54) LOW TEMPERATURE CURE HEAT-CURABLE POWDER COATING COMPOSITION COMPRISING A CRYSTALLINE POLYESTER RESIN, AN AMORPHOUS POLYESTER RESIN, A CROSSLINKING AGENT AND A THERMAL RADICAL INITIATOR

(75) Inventors: Tosko Alexandar Misev, Zwolle (NL); Leendert Jan Molhoek, Zwolle (NL); Johan Franz Gradus Antonius Jansen, Echt (NL); Nicole Van Der Werf, Zwolle (NL); Sven Johan Wilbert Reijmer, Zwolle (NL); Jan Pieter Drijfhout, Zwolle (NL); Peter Wellenberg, Zwolle (NL)

(73) Assignee: DSM IP ASSETS B.V., Heerlen (NL)

( * ) Notice: Subject to any disclaimer, the term of this patent is extended or adjusted under 35 U.S.C. 154(b) by 177 days.

This patent is subject to a terminal disclaimer.

(21) Appl. No.: 13/696,449

(22) PCT Filed: May 6, 2011

(86) PCT No.: PCT/EP2011/057294
§ 371 (c)(1),
(2), (4) Date: Mar. 22, 2013

(87) PCT Pub. No.: WO2011/138432
PCT Pub. Date: Nov. 10, 2011

(65) Prior Publication Data
US 2013/0203938 A1 Aug. 8, 2013

(30) Foreign Application Priority Data

May 6, 2010 (EP) ..................... 10162159
May 6, 2010 (EP) ..................... 10162176

(51) Int. Cl.
| | | |
|---|---|---|
| C08L 67/00 | (2006.01) | |
| C08K 5/00 | (2006.01) | |
| C09D 167/02 | (2006.01) | |
| C09D 167/00 | (2006.01) | |
| C09D 167/06 | (2006.01) | |
| C08K 3/00 | (2006.01) | |
| C08K 5/06 | (2006.01) | |
| C08K 5/10 | (2006.01) | |
| C08K 5/101 | (2006.01) | |
| C08K 5/14 | (2006.01) | |
| C08L 67/06 | (2006.01) | |

(52) U.S. Cl.
CPC ............. *C09D 167/02* (2013.01); *C08L 67/00* (2013.01); *C09D 167/00* (2013.01); *C09D 167/06* (2013.01); *C08K 3/0016* (2013.01); *C08K 5/0025* (2013.01); *C08K 5/06* (2013.01); *C08K 5/10* (2013.01); *C08K 5/101* (2013.01); *C08K 5/14* (2013.01); *C08L 67/06* (2013.01)

(58) Field of Classification Search
None
See application file for complete search history.

(56) References Cited

U.S. PATENT DOCUMENTS

| | | |
|---|---|---|
| 5,304,332 A | 4/1994 | Richart |
| 5,480,726 A | 1/1996 | Richart |
| 5,922,473 A | 7/1999 | Muthiah et al. |
| 6,005,017 A | 12/1999 | Daly et al. |
| 6,017,593 A * | 1/2000 | Daly et al. ............... 427/559 |
| 6,017,640 A | 1/2000 | Muthiah et al. |
| 6,048,949 A | 4/2000 | Muthiah et al. |

(Continued)

FOREIGN PATENT DOCUMENTS

| | | |
|---|---|---|
| EP | 0 431 656 | 6/1991 |
| EP | 0 636 669 A2 | 2/1995 |

(Continued)

OTHER PUBLICATIONS

International Search Report for PCT/EP2011/057294 mailed Aug. 16, 2011.

(Continued)

*Primary Examiner* — Ana Woodward
(74) *Attorney, Agent, or Firm* — Nixon & Vanderhye P.C.

(57) ABSTRACT

The invention relates to a heat-curable powder coating composition comprising i) at least one crystalline polyester resin present in an amount of at most 90 wt %; and ii) at least one amorphous polyester resin; and iii) at least one crosslinking agent; and iv) at least one thermal radical initiator, wherein, the at least one crystalline polyester resin and/or the at least one amorphous polyester resin has di-acid ethylenic unsaturations; wherein the at least one crosslinking agent is either crystalline or amorphous; wherein the at least one crosslinking agent has reactive unsaturations that are reactable with the ethylenic unsaturations of the di-acid ethylenic unsaturations of the at least one crystalline polyester resin and/or the at least one amorphous polyester resin to be crosslinked, said unsaturations of the crosslinking agent are different from the unsaturations of the at least one crystalline polyester resin and the unsaturations of the at least amorphous polyester resin; wherein the wt % is based on the total amount of i)+ii)+iii). The compositions of the invention may be cured to an acceptable degree at low temperature of for example at most 130° C. for at most 20 minutes, said compositions may be ground, sieved and extrudable and said compositions can upon heat cure form powder coatings that may also exhibit a good balance of properties between good flexibility, good smoothness and good adhesion. In addition, the compositions of the invention can suitably be used on heat- and/or non heat-sensitive, even if the composition is highly pigmented.

88 Claims, No Drawings

(56) References Cited

U.S. PATENT DOCUMENTS

| | | |
|---|---|---|
| 6,194,525 B1 | 2/2001 | Ortiz et al. |
| 6,235,228 B1 | 5/2001 | Nicholl et al. |
| 2003/0087029 A1 | 5/2003 | Decker et al. |
| 2005/0137279 A1 | 6/2005 | Decker et al. |
| 2005/0153070 A1 | 7/2005 | Decker et al. |

FOREIGN PATENT DOCUMENTS

| | | |
|---|---|---|
| EP | 0 844 286 | 5/1998 |
| EP | 0 636 669 B1 | 4/1999 |
| EP | 0 942 050 | 9/1999 |
| EP | 0 957 141 | 11/1999 |
| EP | 0 957 142 | 11/1999 |
| EP | 1 195 392 | 4/2002 |
| EP | 1 195 393 | 4/2002 |
| EP | 1 023 353 | 2/2004 |
| EP | 1 398 357 | 3/2004 |
| EP | 1 424 142 | 6/2004 |
| EP | 1 477 534 | 11/2004 |
| JP | 47-026189 | 7/1972 |
| JP | 55-27324 | 2/1980 |
| WO | 97/27253 | 7/1997 |
| WO | 97/38034 | 10/1997 |
| WO | 99/14254 | 3/1999 |
| WO | 02/100957 | 12/2002 |
| WO | WO 02/100957 | 12/2002 |
| WO | 2006/082080 | 8/2006 |
| WO | 2007/045609 | 4/2007 |
| WO | 2007/134736 | 11/2007 |
| WO | 2010/052290 | 5/2010 |
| WO | 2010/052291 | 5/2010 |
| WO | 2010/052293 | 5/2010 |
| WO | 2010/052294 | 5/2010 |
| WO | 2010/052295 | 5/2010 |
| WO | 2010/052296 | 5/2010 |
| WO | WO 2010/052290 | 5/2010 |

OTHER PUBLICATIONS

International Preliminary Report on Patentability mailed May 4, 2012.

* cited by examiner

LOW TEMPERATURE CURE HEAT-CURABLE POWDER COATING COMPOSITION COMPRISING A CRYSTALLINE POLYESTER RESIN, AN AMORPHOUS POLYESTER RESIN, A CROSSLINKING AGENT AND A THERMAL RADICAL INITIATOR

This application is the U.S. national phase of International Application No. PCT/EP2011/057294 filed 6 May 2011 which designated the U.S. and claims priority to EP 10162176.1 filed 6 May 2010, EP 10162159.7 filed 6 May 2010 the entire contents of each of which are hereby incorporated by reference.

The invention relates to a heat-curable powder coating composition, a process for the preparation thereof, a process for coating a substrate with said composition, a substrate coated with said composition and/or to use of the heat-curable powder coating composition.

Powder coating compositions (commonly referred to as "powders") which are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions are also clean and convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded article to be coated. The article usually at room temperature is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The invention relates to the field of thermosetting powder coating compositions. By "thermosetting powder coating compositions" is meant herein, a mixture of components and which compositions have the ability to form an irreversible crosslinked network (the so-called 'cured form') upon curing, preferably heat curing. The preparation of thermosetting powder coating compositions is described by Misev in "Powder Coatings, Chemistry and Technology" (pp. 224-300; 1991, John Wiley & Sons Ltd.).

As shown by the article "Overview of the powder coatings market worldwide" by G. Maggiore in Pitture e Vernice Europe 1/92, pp. 15-22 and by the lecture by D. Richart "Powder Coating: Current Developments, Future Trends" (Waterborne, High-Solids and Powder Coatings Symposium, Feb. 22-24, 1995), the search is still continuing for powder coating compositions which can be cured with little thermal stress of the substrate and which consequently are suitable for use on heat-sensitive substrates such as, for example, wood and plastic.

Heat-sensitive substrates may be coated using radiation curable powder coating compositions, such as described in EP 0636669. However, when using heavily pigmented powder coating compositions, there is a chance that the radiation does not penetrate through the powder coating composition resulting in an unevenly cured powder coating. Also, when using radiation to cure a powder coating composition on complex three-dimensional objects, the radiation may not reach all corners of the object, also resulting in an unevenly cured coating. Therefore, there is still a need for an alternative cure system that does not have the above mentioned disadvantages. Such an alternative may be a thermally curable powder coating composition that can be cured to an acceptable degree at low temperatures of for example at most 130° C. during at most 20 minutes.

Heat-curable powder coating compositions comprising an amorphous unsaturated polyester resin for example a polyester resin having di-acid based ethylenic unsaturations and a crystalline crosslinking agent, (for example a vinylether of low molecular weight commercially available as Uracross™ P3307 from DSM Resins) and a thermal initiator are known in the art for being able to cure at an acceptable degree at low temperatures and may afford powder coatings that have relatively good flexibility. Nevertheless, when forming heat-curable powder coating compositions it is desirable to use amorphous crosslinking agents having a substantially higher molecular weight than Uracross™ P3307 for many reasons; for example to reduce leaching from the powder coating of unreacted low molecular weight species; to balance properties such as acceptable cure at low temperatures, good flexibility, good smoothness and/or adhesion. Flexibility is particularly important when a coating is used on furniture, such as wooden chairs and kitchen cabinets. A solution to this challenge has not been reported.

Besides the desire for a powder coating composition that can be cured at low temperature, it is also desired that such a powder coating composition can still be ground, sieved, extrudable and/or evenly cured. This is useful for commercially viable powders since said compositions can prepared in existing powder paint job shops without major investments in new equipment or fundamentally different processes. Furthermore, it would be desirable to provide flexible powder coatings that may sustain substrate stresses without been delaminated and/or cracked. This is especially useful when the article to be powder coated has a complex three-dimensional shape and/or when a coating is used on furniture, such as wooden/metal chairs and kitchen cabinets. Furthermore, it would be desirable to have powder coating compositions that can exhibit an array of balanced properties as described herein, both in cases where the crosslinking agent is amorphous or crystalline.

It is therefore an object of the invention to address some or all of the problems identified herein.

Therefore, broadly in accordance with the invention there is provided

A heat curable powder coating composition comprising:
 i) at least one crystalline polyester resin present in an amount of at most 90 wt %; and
 ii) at least one amorphous polyester resin; and
 iii) at least one crosslinking agent; and
 iv) at least one thermal radical initiator,
 wherein,
  the at least one crystalline polyester resin and/or the at least one amorphous polyester resin has di-acid ethylenic unsaturations;
  the at least one crosslinking agent is either crystalline or amorphous;
  the at least one crosslinking agent has reactive unsaturations that are reactable with the ethylenic unsaturations of the di-acid ethylenic unsaturations of the at least one crystalline polyester resin and/or the at least one amorphous polyester resin to be crosslinked, said unsaturations of the crosslinking agent are different from the unsaturations of the at least one crystalline polyester resin and the unsaturations of the at least amorphous polyester resin;
  the wt % is based on the total amount of i)+ii)+iii).

The heat-curable composition of the invention may be cured to an acceptable degree at low temperature, for example at most 130° C. for at most 20 minutes. The composition of the invention may be ground, sieved and extruded. After heat-curing the composition may form powder coatings that may also exhibit a good balance of properties between good flexibility, good smoothness and good adhesion. It was also surprisingly found that the compositions of the invention can exhibit an array of balanced properties as described herein, both in cases where the crosslinking agent is amorphous or crystalline.

The composition of the invention can suitably be used on heat- and/or non heat-sensitive, even if the composition is highly pigmented or if the composition is used on a three dimensional complex article. Furthermore, since it is not necessary to use a lot of energy to cure the powder coating composition, the composition of the invention also has environmental benefits.

Unless otherwise stated, the total amount (wt %) of i)+ii)+iii) equals 100%.

Preferably, the at least crystalline polyester resin and the at least one amorphous polyester resin of the composition of the invention, have each di-acid ethylenic unsaturations.

Preferably, the at least one crosslinking agent of the composition of the invention has a theoretical Mn of less than 2,200.

Preferably the at least one crystalline polyester of the composition of the invention is present in an amount of at least 6 wt % and of at most 90 wt %.

Preferably the at least one crystalline polyester of the composition of the invention is present in an amount of at least 20 wt % and of at most 55 wt %.

Preferably the at least one crystalline polyester resin and the at least one amorphous polyester resin of the composition of the invention, have each a theoretical Mn of at least 2,200 Da and of at most 8,000 Da.

Preferably the at least one crosslinking agent of the composition of the invention is crystalline.

Preferably the at least one crosslinking agent of the composition of the invention is crystalline and is present in an amount of at least 17.5 wt % based on the total amount of i)+ii)+iii).

Preferably, the di-acid ethylenic unsaturation is a 2-butene-dioic acid ethylenic unsaturation.

Preferably the at least one crosslinking agent of the composition of the invention is a vinylether or a vinylester.

Preferably the thermal radical initiator of the composition of the invention is a peroxide chosen from the group of per-esters and monopercarbonates according to formula (I)

wherein $R^1$ represents an optionally substituted $C_{1-20}$ alkyl, a $C_{6-20}$ aryl or $OR^5$, wherein $R^5$ represents an optionally substituted $C_{1-20}$ alkyl or an optionally substituted $C_{6-20}$ aryl; $R^2$ represents an optionally substituted $C_{1-20}$ alkyl or an optionally substituted $C_{6-20}$ aryl; and

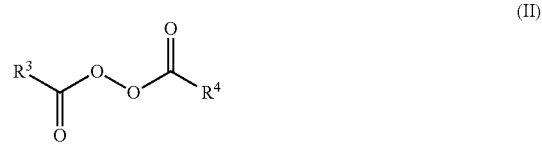

wherein $R^3$ and $R^4$ each independently represent an optionally substituted $C_{1-20}$ alkyl, a $C_{6-20}$ aryl or $OR^6$, wherein $R^6$ represents an optionally substituted $C_{1-10}$ alkyl or a $C_{6-20}$ aryl; and any combination of peroxides according to formula (I) and formula (II) thereof.

Preferably $R^2$ represents tert-butyl.
Preferably, $R^1$ represents phenyl and $R^2$ represents tert-butyl.
Preferably $R^3$ and $R^4$ both represent phenyl or both represent undecane.

Preferably the composition further comprises a transition metal compound.

Preferably the composition further comprises a transition metal compound chosen from the group of transition metal salts, transition metal complexes and mixtures thereof, of transition metals chosen from the group of Mn, Fe, Co and Cu.

Preferably the composition of the invention further comprises an inhibitor chosen from the group of phenolic compounds, stable radicals, catechols, phenothiazines, hydroquinones, benzoquinones or mixtures thereof.

In the composition of the invention, the amount of the at least one crystalline polyester resin is preferably at least 0.05, more preferably at least 2, even more preferably at least 6, most preferably at least 7, especially at least 10, more especially at least 15, even more especially at least 17.5, most especially at least 19, for example at least 20 wt % based on the total amount of i)+ii)+iii). Preferably the amount of the at least one crystalline polyester resin is at most 90, more preferably at most 80, even more preferably at most 75, most preferably at most 70, especially at most 65, more especially at most 60, most especially at most 55, for example at most 50, for example at most 40 wt % based on the total amount of i)+ii)+iii). In the composition of the invention, the amount of crystalline component is preferably in the range of 15-40 wt % based on the total amount of i)+ii)+iii).

In the composition of the invention, the amount of the at least one amorphous polyester resin is preferably at least 0.05, more preferably at least 2, even more preferably at least 6, most preferably at least 7, especially at least 10, more especially at least 15, even more especially at least 17.5, most especially at least 19, for example at least 20 wt % based on the total amount of i)+ii)+iii). Preferably the amount of the at least one amorphous polyester resin is at most 96, more preferably at most 91, even more preferably at most 85, most preferably at most 75, especially at most 72, more especially at most 65, most especially at most 60, for example at most 55 wt % based on the total amount of i)+ii)+iii). In the composition of the invention, the amount of the at least one amorphous polyester resin is preferably in the range of 20-55 wt % based on the total amount of i)+ii)+iii).

In the composition of the invention, the amount of the at least one crosslinking agent is preferably at least 4, more preferably at least 4.5, even more preferably at least 6, most preferably at least 7, especially at least 10, more especially at least 15, even more especially at least at least 16, most especially at least 17.5, for example at least 19, for example at least at least 20, for example at least 30 wt % based on the total amount of i)+ii)+iii). Preferably the amount of the at least one crosslinking agent at most 85, more preferably at most 70, even more preferably at most 65, most preferably at most 60, especially at most 55, more especially at most 50, even more especially at most 45, for example at most 40 wt % based on the total amount of i)+ii)+iii). In the composition of the invention, in case the at least one crosslinking agent is crystalline, then the amount of the at least one crosslinking agent is preferably in the range of 16-40 wt % based on the total amount of i)+ii)+iii). In the composition of the invention, in case the at least one crosslinking agent is amorphous, then the amount of the crosslinking agent is preferably in the range of 30-55 wt % based on the total amount of i)+ii)+iii).

DEFINITIONS

By "cure to an acceptable degree at low temperatures" is meant that the powder coating when cured at most 130° C. for at most 20 minutes, is able to resist at least 100 acetone double rubs (ADR).

By "good flexibility" is meant herein that a powder coating presented at least 0.8 mm of minimum depth of indentation to cause failure as measured using the cupping test according to ISO1520:2006. More preferred powder coatings have at least 1.0 mm of minimum depth of indentation to cause failure.

By "good adhesion" is meant herein that the adhesion of a powder coating is characterized as G0 to G2 on a scale from G0 (best adhesion) to G5 (worst adhesion) when measured according to a cross-cut test (Gitterschnitt) in accordance with ISO 2409 (edition 3, dated 15 May 2007) as described herein. More preferred powder coatings have adhesion ranging from G0 to G1.

By "good smoothness" (in literature, the term "smoothness" is also referred to as "flow") is meant herein that the smoothness of a powder coating was characterized as equal or higher to 2 on a scale ranging from 1 to 10 and it was measured as described herein. The rating of smoothness is from 1 to 10, with 1 representing the roughest coating and 10 representing the smoothest coating. More preferred powder coatings have smoothness equal or higher to 3, even more preferably equal or higher to 4, most preferably equal or higher to 5.

By "curing" is meant herein the process of becoming "set" that is to form an irreversibly crosslinked network (the so-called "cured form"), a material that can no longer flow, be melted or dissolved. Herein, the terms "curing" "cure" and "crosslinking" are used interchangeably. Preferably, the curing of the heat-curable powder coating composition of the invention takes place using heat and in that case the curing can be called "heat curing". For clarity, the term heat curing does not include ultraviolet (UV) or electron beam induced curing. Optionally, a combination of heat and pressure can be used to cure the heat-curable powder coating compositions of the invention. In the context of the invention, the term "heat curing" does not exclude the application of pressure along with heat in order to cure the heat-curable powder coating compositions of the invention.

By "room temperature" is meant herein a temperature of 23° C.

A "resin" is herein understood to have the same meaning as it has to a skilled person in thermosetting polymer chemistry, namely as a low molecular weight polymer having reactive moieties such as for example ethylenic unsaturations, said polymer is able to crosslink. The term "low molecular weight" means a theoretical number average molecular weight (Mn) lying between 2,200, and 20,000 Da. Preferably the Mn is at most 15,000 Da, even more preferably is at most 8,000, most preferably is at most 7,000, especially is at most 6,000, more especially is at most 5,000 Da. Preferably the Mn is at least 2,250, more preferably is at least 2,300, even more preferably is at least 2,350, most preferably is at least 2,400 Da. A resin may for example be a low molecular weight polyester, especially a low molecular weight polyester having 2-butenedioic acid ethylenic unsaturations. Therefore, a polyester resin is a polyester with a theoretical Mn as described above in the same paragraph. In the case of a neat resin, these reactive moieties via a chemical reaction preferably induced by means of heat, ultimately connect the polymer chains together through the formation of permanent covalent (crosslink) bonds, resulting to the cured resin. A resin is classified as acid functional in case its hydroxyl value (OHV) is lower than its acid value (AV). A resin is classified as hydroxyfunctional in case its acid value is lower than its hydroxyl value. In the context of the invention the acid value of a resin (AV in mg KOH/g of resin) is measured titrimetrically according to ISO 2114-2000, whereas the hydroxyl value of a resin (OHV in mg KOH/g of resin) is measured using ISO 4629-1978. The acid value of a polyester resin is a measure for the amount of acid groups in the polyester resin whereas the hydroxyl value of a polyester resin is a measure for the amount of hydroxyl groups in the polyester resin.

By "crosslinking agent" or "co-crosslinker" is meant herein any organic monomer, oligomer or polymer having unsaturations that are reactable with the ethylenic unsaturations of an unsaturated resin to be crosslinked, said unsaturations of the crosslinking agent are different from those of the unsaturated resin, the crosslinking agent having an Mn ranging from at least 100 to at most 20,000 Da. Preferred crosslinking agents have an Mn of less than 2,200 Da. The crosslinking agent, may be chosen from the group of components bearing acrylate, methacrylate, vinylester, vinylether, vinyl amide, alkyne ether, alkyne ester, alkyne amide, alkyne amine, propargyl ether, propargyl ester, itaconate, enamine, thiol, allyl (or combinations thereof) groups and/or mixtures of aforementioned components. The crosslinking agent can be a compound, an oligomer or a polymer. The crosslinking agent can be a combination of an amorphous with a crystalline and/or even with a liquid component. An example of liquid crosslinking agent is a vinyl acetate. An example of a crosslinking agent that is a polymer is a polyester resin having itaconic acid ethylenic unsaturations; said polyester resin may be obtainable from itaconic acid and/or derivatives thereof.

By "composition" is meant herein the combining and/or mixture of distinct chemical substances and/or components to form a whole.

By "powder" is meant herein, a substantially dry solid substance reduced to a state of fine, loose particles wherein the individual particles have a maximum particle size of at most 130 μm at 23° C. and at atmospheric pressure, for example a particle size of at most 110 μm, for example of at most 90 μm at 23° C. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms "particle size" and "particle size distribution" will be used interchangeably in the context of the invention when used in relation to a powder. The method used to measure the particle size of the granular material according to the invention is sieve analysis. According to it, the powder is separated on sieves of different sizes. Thus, the PSD is defined in terms of discrete size ranges: e.g. "% of sample powder has particle size in the range of 80 microns to 90 microns", when sieves of these sizes are used.

By "substantially dry" is meant herein that the component does not contain any deliberately added water or moisture but the component may contain moisture absorbed from the atmosphere in an amount of up to 30, preferably up to 20% w/w based on the total weight of the component.

By "heat-curable powder coating composition" is meant herein a composition in the form of a powder at 23° C., said composition has the ability to cure upon heating. For clarity, the composition of the invention is heat-curable.

The term '(semi)crystalline' denotes both crystalline and semicrystalline.

The terms amorphous, semicrystalline, crystalline used to characterize a polymer are informal terms used in the art to indicate the predominant character of the relevant polymer in respect to its degree of crystallinity but these terms are defined more precisely herein by melting enthalpy ($\Delta Hm$) values.

By "amorphous" is meant herein that a component has a melting enthalpy ($\Delta Hm$) lower than 40 J/g. Preferably, the amorphous component does not have a melting temperature (Tm).

By "crystalline" is meant herein that a component has a melting enthalpy ($\Delta Hm$) of at least 40 J/g and it has a melting temperature. Preferably, the melting enthalpy ($\Delta Hm$) of the crystalline component is at least 50, more preferably at least 60 J/g and/or at most 150, for example at most 140, for example at most 130 J/g. The melting enthalpy ($\Delta Hm$) is measured using DSC as described herein.

The term "ethylenic unsaturation" as used herein means cis- or trans-configured reactive carbon-carbon double bond unsaturation and does not include aromatic unsaturation, carbon-carbon triple bond, carbon-heteroatom unsaturation.

By "unsaturated resin" is meant herein a resin having ethylenic unsaturations. For example a polyester resin having 2-butenedioic acid ethylenic unsaturations, is an unsaturated polyester resin.

By "thermal radical initiator" is meant herein any organic compound that upon heating is able to generate free radicals and initiate radical crosslinking in the composition of the invention.

By peroxide is meant herein any of a class of organic compounds whose molecules contain two oxygen atoms bound together and upon heating generates free radicals and initiates radical crosslinking in the composition of the invention. Peroxide is a thermal radical initiator.

By "powder coating" is meant herein the partially or fully cured form of the heat-curable powder coating composition of the invention.

By "article" is meant herein an individual object or item or element of a class designed to serve a purpose or perform a special function and can stand alone.

The term 'di-acid' as used herein means a dicarboxylic acid or dianhydride or diester or other derivatives of a dicarboxylic acid such as for examples dicarboxylic acid salts.

The term 'di-acid ethylenic unsaturations' as used herein means ethylenic unsaturations obtainable from any isomer of an unsaturated di-acid and/or derivatives thereof, such as for example ethylenic unsaturations obtainable from a di-acid chosen from the group of 2-butenedioic acid, 2-methyl-2-butenedioic acid, itaconic acid and mixtures thereof.

By "polyester resin having di-acid ethylenic unsaturations" is meant herein, a polyester resin comprising ethylenic unsaturations obtainable from any isomer of unsaturated di-acids and/or derivatives thereof, for example from any isomers of any of the following monomers: 2-butenedioic acid, 2-methyl-2-butenedioic acid, itaconic acid. Derivatives of any isomer of unsaturated di-acids include esters, anhydrides, acid salts. Fumaric acid and maleic acid are isomers of 2-butenedioic acid. Maleic acid is the cis-isomer of 2-butenedioic acid, whereas fumaric acid is the trans-isomer of 2-butenedioic acid. Citraconic acid and mesaconic acid are isomers of 2-methyl-2-butebedioic acid. Citraconic acid is the cis-isomer of 2-methyl-2-butenedioic acid, whereas mesaconic acid is the trans-isomer of 2-methyl-2-butenedioic acid. The "polyester resin having di-acid ethylenic unsaturations" may for example be prepared from fumaric, maleic, itaconic, citraconic and/or mesaconic acids, derivatives thereof and/or mixtures thereof.

By "polyester resin having 2-butenedioic acid ethylenic unsaturations" is meant herein, a polyester resin comprising ethylenic unsaturations obtainable from any isomer of 2-butenedioic acid and/or derivatives thereof. Derivatives of any isomer of 2-butenedioic acid include esters, anhydrides, acid salts. The "polyester resin having 2-butenedioic acid ethylenic unsaturations" may for example be prepared from fumaric, and/or maleic acids, derivatives thereof and/or mixtures thereof. Derivatives of fumaric acid and of maleic acid include esters, anhydrides, acid salts. Maleic acid and maleic acid anhydride partly isomerize to fumaric acid when used in the synthesis of a polyester resin having 2-butenedioic acid ethylenic unsaturations.

Fumaric acid based unsaturation is an informal term used herein to denote unsaturation derived from fumaric acid, its isomers e.g. maleic acid and/or derivatives thereof.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By "Mn" is meant herein the theoretical number average molecular weight and it is calculated as shown in the Examples unless stated otherwise.

By "WPU" is meant herein the theoretical weight per ethylenic unsaturation, unless otherwise stated. The WPU is calculated by dividing the Mn of a compound, for a example an unsaturated polyester resin as described herein, by the amount of ethylenic unsaturations as added during the synthesis of said compound. The WPU may also be measured ("measured WPU"), for example using $^1$H-NMR, for example as described in Journal of Applied Polymer Science, Vol. 23, 1979, pp 25-38, the complete disclosure of which is hereby incorporated by reference, or via $^1$H-NMR on a 300 MHz Varian NMR-spectrometer using pyrazine as internal standard. In the Examples, the WPU was also determined via $^1$H-NMR on a 300 MHz Varian NMR-spectrometer using pyrazine as internal standard and in this case the WPU is referred to as the "measured WPU". If the WPU refers to a crosslinking agent, then by "WPU" is meant herein the theoretical weight per the type of unsaturation the crosslinking agent has and the WPU of the crosslinking agent is calculated by dividing the Mn of the crosslinking agent by the amount of the unsaturations as added during the synthesis of the crosslinking agent. The WPU of a crosslinking agent may also be measured experimentally for example using $^1$H-NMR as described herein above.

By "pph" is meant herein parts of an ingredient in the composition of the invention per hundred parts of resins and crosslinking agent.

The glass transition temperature (Tg) (inflection temperature), melting temperature (Tm), crystallization temperature (Tc) and melting enthalpy (ΔHm) measurements were carried out via differential scanning calorimetry (DSC) on a Mettler Toledo, TA DSC821, in $N_2$ atmosphere as described herein.

By "viscosity" (η) is meant herein the melt viscosity (in Pa·s) at 160° C. Viscosity measurements were carried out at 160° C., on a Rheometric Scientific CT 5 (Rm 265) apparatus (Mettler Toledo). The applied shear-rate is 70 s$^{-1}$ and a 30 mm spindle was used.

By "(N)IR lamp" is meant herein denotes both a Near-IR lamp and an IR lamp.

For all upper and lower boundaries of any parameters given herein, the boundary value is included in each range for each parameter. All combinations of minimum and maximum values of the parameters described herein may be used to define the parameter ranges for various embodiments and preferences of the invention. For clarity the term "less than a value" does not include this value. For example a compound having a Mn of less than 2,200 Da, is meant herein that the Mn of the compound can be any value up to but not including 2,200 Da. For clarity the term "at least a value" does include this value. For example a compound having a Mn of at least 2,200 Da, is meant herein that the Mn of the compound can be any value from and including 2,200 Da.

In the context of the invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The term "comprising" as used herein means that the list that immediately follows is non exhaustive and may or may not include any other additional suitable items, for example one or more further feature(s), component(s), ingredient(s) and/or substituent(s) as appropriate. "Substantially comprising" as used herein means a component or list of component(s) is present in a given material in an amount greater than or equal to about 90% w/w, preferably greater than or equal to 95% w/w, more preferably greater than or equal to 98% w/w of the total amount of the given material. The term "consisting of" as used herein mean that the list that follows is exhaustive and does not include additional items.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein. Unless otherwise stated, the total amount (wt %) of i)+ii)+iii) equals 100%.

Unless the context clearly indicates otherwise, as used herein plural forms of the terms herein (for example composition, component, resin, polymer) are to be construed as including the singular form and vice versa.

Resins & Blends Thereof.

The composition of the invention may have an amorphous component and a crystalline component.

The amorphous component may for example be an amorphous organic compound, an amorphous oligomer, an amorphous polymer or any combinations or mixtures thereof, for example an amorphous oligomer and an amorphous polymer, two different amorphous polymers, two different amorphous polymers and an amorphous oligomer, an amorphous compound and an amorphous polymer, etc.

The amorphous compound has a theoretical Mn of less than 400 Da.

An example of an amorphous oligomer includes an amorphous crosslinking agent as described herein.

The amorphous oligomer has a theoretical Mn of at least 400 Da and less than 2,200 Da.

The amorphous polymer has a theoretical Mn of at least 2,200 Da. An example of an amorphous polymer includes amorphous resins, for example amorphous polyesters, amorphous polyacrylates (acrylic resins), amorphous polyurethanes, amorphous epoxy resins, amorphous polyamides, amorphous polyesteramides, amorphous polycarbonates, amorphous polyureas etc., as well as mixtures thereof.

The amorphous component preferably has a glass transition temperature (Tg) of at least 20° C., for example a Tg of at least 25° C., more preferably at least 40° C., even more preferably at least 45° C. and/or a Tg of at most 80° C., more preferably at most 65° C., even more preferably at most 60° C., for example at most 55° C., for example at most 50° C.

Preferably, the viscosity at 160° C. of the amorphous component as measured using the method as described herein is in the range of from 2 to 50 Pa·s as measured at 160° C.

In the composition of the invention, the amount of amorphous component is preferably at least 0.05, more preferably at least 2, even more preferably at least 6, most preferably at least 7, especially at least 10, more especially at least 15, even more especially at least 17.5, most especially at least 19, for example at least 20 wt % based on the total amount of resins and crosslinking agent. Preferably the amount of amorphous component is at most 96, more preferably at most 91, even more preferably at most 85, most preferably at most 75, especially at most 72, more especially at most 65, most especially at most 60, for example at most 55 wt % based on the total amount of resins and crosslinking agent. In the composition of the invention, the amount of crystalline component is preferably in the range of 20-55 wt % based on the total amount of resins and crosslinking agent.

The crystalline component may for example be a crystalline organic compound, an crystalline oligomer, a crystalline polymer or any combinations or mixtures thereof, for example a crystalline oligomer and a crystalline polymer, two different crystalline polymers, two different crystalline polymers and a crystalline oligomer, a crystalline compound and a crystalline polymer etc.

An example of a crystalline compound includes crystalline vinylesters, and vinylethers. In the framework of the invention, a compound has a theoretical Mn of less than 400 Da.

An example of a crystalline oligomer includes a crystalline crosslinking agent as described herein. The crystalline oligomer has a theoretical Mn of at least 400 and less than 2,200 Da.

The crystalline polymer has a theoretical Mn of at least 2,200 Da. An example of a crystalline polymer includes crystalline resins, for example crystalline polyesters, crystalline polyacrylates (acrylic resins), crystalline polyurethanes, crystalline epoxy resins, crystalline polyamides, crystalline polyesteramides, crystalline polycarbonates, crystalline polyureas etc., as well as mixtures thereof.

The crystalline component preferably has a melting temperature ($T_m$) of at least 30° C., for example a melting temperature of at least 40° C. Preferably, the $T_m$ of the crystalline component is not more than 200° C., more preferably not more than 180° C., even more preferably not more than 160° C., even more preferably not more than 140° C., most preferably not more than 120° C.

Preferably, the crystalline component has a crystallization temperature ($T_c$) of at least 30° C., for example a $T_c$ of at least 40° C. Preferably, the $T_c$ of the crystalline component is not more than 200° C., more preferably not more than 180° C., even more preferably not more than 160° C., even more preferably not more than 140° C., most preferably not more than 120° C.

The $T_c$ of the crystalline component is lower than its $T_m$. Preferably the $T_c$ of the crystalline component is at most 55° C. lower than its $T_m$, for example at most 40° C., for example at most 25° C. If the crystalline component has a glass transition temperature (Tg), the glass transition temperature is preferably at least −70° C., more preferably −50° C., even more preferably at least −30° C., even more preferably at least −20° C., most preferably at least −10° C., especially at least 0° C., more especially at least 10° C., even more especially at least 20° C.

Preferably, the viscosity of the crystalline component as measured using the method as described herein is in the range of from 0.1 to 30 Pa·s.

In the composition of the invention, the amount of crystalline component is preferably at least 0.05, more preferably at least 2, even more preferably at least 6, most preferably at least 7, especially at least 10, more especially at least 15, even more especially at least 17.5, most especially at least 19, for example at least 20 wt % based on the total amount of resins and crosslinking agent. Preferably the amount of crystalline component is at most 90, more preferably at most 80, even more preferably at most 75, most preferably at most 70, especially at most 65, more especially at most 60, most especially at most 55, for example at most 50, for example at most 40 wt % based on the total amount of resins and crosslinking agent. In the composition of the invention, the amount of crystalline component is preferably in the range of 15-40 wt % based on the total amount of resins and crosslinking agent.

The composition of the invention preferably comprises polyester resins, more preferably unsaturated polyester resins, even more preferably polyester resins having di-acid ethylenic unsaturations, most preferably polyester resins having 2-butenedioic acid ethylenic unsaturations. The polyester resins of the invention may be amorphous or crystalline.

The polyester resins of the composition of the invention may be amorphous or crystalline.

Polyester resins are generally polycondensation products of polyalcohols and polycarboxylic acids. According to the invention a polyester resin is preferably the polycondensation product of polyalcohols and polycarboxylic acids, more preferably a polyester resin is the polycondensation product of dicarboxylic acids, dialcohols (diols) and trifunctional alcohols or carboxylic acids.

Examples of polycarboxylic acids, especially dicarboxylic acids which may be used in the preparation of a polyester resin include isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative polycarboxylic acids can be used in their acid form or where available, in the form of their anhydrides, acyl chlorides or lower alkyl esters. Mixtures of polycarboxylic acids can also be used. In addition hydroxycarboxylic acids and lactones can be used. Examples include hydroxypivalic acid and ε-caprolactone.

Polyalcohols, in particular diols, can be reacted with the carboxylic acids or their analogues as described above to prepare the polyester resin. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Monofunctional carboxylic acids, for example para-tert-butyl benzoic acid, benzoic acid, methyl benzoic acid, cinnamic acid, crotonic acid may be used to block the polymer chain.

Trifunctional or more functional alcohols or carboxylic acids can be used to obtain branched polyesters. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA). To obtain branched polyesters trifunctional monomers such as trimethylolpropane may be used.

The polyesters can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester resin.

The conditions for preparing a polyester resin and the COOH/OH ratio can be chosen such that end products are obtained which have an acid value or hydroxyl value which is within the intended range of values.

The polyester resins of the compositions of the invention may also have di-acid ethylenic unsaturations. Examples of how to introduce di-acid ethylenic unsaturations, such as 2-butenedioic acid ethylenic unsaturations, in the polyester resin are described herein. The di-acid ethylenic unsaturations may be present in the backbone of the polyester, pendant on the (backbone of the) polyester, at the terminus of the polyester or at a combination of these locations. Preferably polyesters having di-acid ethylenic unsaturations have di-acids chosen from the group of 2-butenedioc acid, itaconic acid and mixtures thereof, more preferably from the group of di-acids chosen from the group of fumaric acid, maleic acid and mixtures thereof. Examples of how to introduce the di-acid ethylenic unsaturations in the polyester are described below. The di-acid ethylenic unsaturation may be built into the polyester backbone, for instance by reacting a hydroxyl functional monomer (such as the polyalcohols mentioned before) with an unsaturated di-acid monomer as mentioned above. It is also possible to connect the di-acid ethylenic unsaturation to the terminus (or termini) of the polyester, for example by reacting a hydroxyl functional terminal group of the polyester with an unsaturated di-acid monomer or its corresponding anhydride as mentioned above The theoretical weight per ethylenic unsaturation (WPU) of the polyester resin having di-acid ethylenic unsaturations such as for example 2-butenedioic acid ethylenic unsaturations is preferably at least 250, more preferably at least 300, even more preferably at least 350, most preferably at least 400 g/mol. Preferably, the WPU of the polyester resin having di-acid ethylenic unsaturations such as for example 2-butenedioic acid ethylenic unsaturations is at most 2000, more preferably at most 1500, even more preferably at most 1300, most preferably at most 1200 g/mole, especially at most 1000 g/mol, for example at most 850 g/mol.

The acid value of a polyester having di-acid ethylenic unsaturations may range from 0 to 250, for example from 0 to 60 mg KOH per g of the polyester. The hydroxyl value of a polyester having di-acid ethylenic unsaturations in the coating composition of the present invention is usually in the range of from 0 to 70 mg KOH per g polyester, for example in the range of from 10 to 70 mg KOH per g polyester.

Preferably, the resin in the powder coating composition of the invention is a polyester resin having di-acid ethylenic unsaturations, said polyester resin is obtainable from at least the following monomers: unsaturated di-acid, terephthalic acid, neopentylglycol and/or propylene glycol. To obtain branched polyesters trifunctional monomers such as trimethylolpropane may be used.

The polyester resin having di-acid ethylenic unsaturations may be crystalline or amorphous.

The crystallinity in a polymer, for example resin, especially for example for a polyester resin, may be introduced by using one or more of the following diacids: succinic acid, adipic acid, sebasic acid or dodecanedioc acid, and/or one or more of the following diols: ethyleneglycol, hexanediol, butanediol in the synthesis.

If the polyester resin having di-acid based unsaturations is amorphous, preferably the glass transition temperature (Tg) and the viscosity (n) at 160° C., are as exemplified for the amorphous component. The theoretical Mn of an amorphous polyester resin having di-acid based unsaturations may for example be in the range of 2,200 Da to 20,000 Da. Preferably the theoretical Mn of an amorphous polyester resin having di-acid based unsaturations is at most 15,000 Da, more preferably at most 10,000, even more preferably at most 8,000 Da, most preferably at most 5,000 Da.

If the polyester resin having di-acid based unsaturations is crystalline, preferably the viscosity, the Tm, Tc and ΔHm are as exemplified for the crystalline component. The Mn of a crystalline polyester resin having di-acid based unsaturations may be in the range of 2,200 Da to 20,000 Da. Preferably the theoretical Mn of a crystalline polyester resin having di-acid based unsaturations is at most 15,000 Da, more preferably at most 10,000, even more preferably at most 8,000 Da, most preferably at most 5,000 Da.

Preferably, the amorphous component comprises a polyester having di-acid ethylenic unsaturations. Preferably the amorphous component comprises a polyester resin having 2-butenedioic acid ethylenic unsaturations. Even more preferably, the amorphous component is the polyester resin having 2-butenedioic acid ethylenic unsaturations. Preferably, the crystalline component comprises a polyester having di-acid ethylenic unsaturations. Preferably the crystalline component comprises a polyester resin having 2-butenedioic acid ethylenic unsaturations. Even more preferably the crystalline component is the polyester resin having 2-butenedioic acid ethylenic unsaturations.

Preferably, the resin in the compositions of the invention, is a polyester resin having 2-butenedioic acid ethylenic unsaturations, which is further prepared from at least the following monomers: terephthalic acid, neopentylglycol and/or propylene glycol. For branching trimethylolpropane may be present in the polyester resin. Besides 2-butenedioic acid ethylenic unsaturations, the polyester resin may of course also have other di-acid ethylenic unsaturations. The 2-butenedioic acid ethylenic unsaturations may be present in the backbone of the polyester resin, pendant on the backbone of the polyester resin, at the terminus of the polyester resin or at a combination of these locations. The 2-butenedioic acid ethylenic unsaturation may be built into the polyester resin backbone, for instance by reacting a hydroxyl functional monomer (such as the polyalcohols mentioned before) with an unsaturated di-acid monomer as mentioned above. It is also possible to connect the ethylenic unsaturation to the terminus (or termini) of the polyester resin, for example by reacting a hydroxyl functional terminal group of the polyester resin with an unsaturated di-acid monomer or its corresponding anhydride as mentioned above.

The polyester resin having 2-butenedioic acid ethylenic unsaturations may be crystalline or amorphous.

Preferably, the Tg of the blended amorphous and crystalline components is at least 5° C., for example at least 25° C. and/or preferably at most 130° C., for example at most 100° C.

In one embodiment of the invention, the difference between the Tg of the amorphous component(s) in the coating composition of the invention and the Tg of the blended amorphous and crystalline components is less than 20° C., more preferably less than 15° C. for example less than 10° C.

In case the blended amorphous and crystalline components have more than one Tg, the difference between the highest and the lowest Tg is preferably not more than 20, for example not more than 10° C.

Preferably, the weight per unsaturation of the blended amorphous and crystalline components in the powder coating composition is less than 2,500 g/mol In another aspect, the invention provides for a heat-curable powder coating composition as described herein wherein the $$\frac{\Delta Hm_{cryst.resin} - \Delta Hm_{blend} / 0.01 * A}{\Delta Hm_{cryst.resin}} * 100\% \quad \text{(III)}$$

is preferably less than 50%, for example less than 40%, less than 30%, less than 20%.

In the above formula (III), $\Delta Hm_{cryst.resin}$ is the $\Delta Hm$ of the crystalline component as determined using the method described herein; $\Delta Hm_{blend}$ is the $\Delta Hm$ of the blend of the amorphous and the crystalline component as determined using the method described herein; A is the amount of crystalline component in wt % relative to the total amount of polymers having an Mn of at least 2,200 Da and the crosslinking agent.

In an embodiment, the invention provides for a composition according to the invention, wherein the $\Delta Hm$ of the crystalline component is at least 60 J/g.

The crystallization temperature ($T_c$) of the crystalline component in a blend with other components is lower than its $T_m$. Preferably the $T_c$ of the crystalline component is at least 20° C., for example at least 25° C., for example at least 40° C. Preferably, the $T_c$ of the crystalline component is at most 55° C. lower than its $T_m$.

In an embodiment, the invention provides for a composition according to the invention wherein the Tc of the crystalline component is at most 55° C. lower than its Tm.

Preferably, in case the composition of the invention comprises a blend of crystalline and amorphous components, the Tg of said blend (without the thermal initiation system) is at least 5° C., for example at least 20° C., for example at least 25° C. and/or preferably at most 130° C., for example at most 100° C.

In case the blended amorphous and crystalline components have more than one Tg, the difference between the highest and the lowest Tg is preferably not more than 20, for example not more than 10° C.

Crosslinking Agent

The crosslinking agent may be amorphous or crystalline. An example of an amorphous crosslinking agent is given in the Examples. An example of a crystalline crosslinking agent is Uracross™ P3307.

In the composition of the invention, the amount of crosslinking agent is preferably at least 4, more preferably at least 4.5, even more preferably at least 6, most preferably at least 7, especially at least 10, more especially at least 15, even more especially at least at least 16, most especially at least 17.5, for example at least 19, for example at least at least 20, for example at least 30 wt % based on the total amount of resins and crosslinking agent. Preferably the amount of amorphous component is at most 85, more preferably at most 70, even more preferably at most 65, most preferably at most 60, especially at most 55, more especially at most 50, even more especially at most 45, for example at most 40 wt % based on the total amount of resins and crosslinking agent. In the composition of the invention, in case the crosslinking agent is crystalline, then the amount of the crosslinking agent is preferably in the range of 16-40 wt % based on the total amount of resins and crosslinking agent. In the composition of the invention, in case the crosslinking agent is amorphous, then the amount of the crosslinking agent is preferably in the range of 30-55 wt % based on the total amount of resins and crosslinking agent.

Crosslinking agents suitable for use in the compositions of the present invention include acrylates, methacrylates, vinylesters, vinylethers, vinyl amides, alkyne ethers, alkyne esters, alkyne amides, alkyne amines, propargyl ethers, propargyl esters, itaconates, enamines, thiols, allyls and mixtures thereof.

Preferably the crosslinking agent is non-volatile at the temperatures and pressures used when processing, applying and storing the powder coating composition. More preferably, the crosslinking agent is preferably solid at room temperature. Preferred crosslinking agents according to the invention have an Mn of less than 2,200 Da. More preferably the crosslinking agents according to the invention have an Mn of at least 200 and less than 2,200 Da, even more preferably of at least 400 and less than 2,200 Da. Preferred crosslinking agents are vinylesters or vinylethers.

In case, the crosslinking agent is a vinylester or a vinylether, the acid value of the polyester having di-acid ethylenic unsaturations is preferably less than 5 mg KOH per g polyester, more preferably less than 2 mg KOH per g polyester. In case the crosslinking agent in the composition of the invention is different from a vinylether and a vinylester, then the polyester having di-acid ethylenic unsaturations may preferably have a higher acid value (for example of 10 mg KOH/g polyester). These preferred combinations of features may result in a powder coating having a better adhesion, especially to metal substrates.

The theoretical WPU of the crosslinking agent is at most 1,100 g/mole, preferably at most 870 g/mole, for example at most 680 g/mole, for example at most 650 g/mole, for example at most 630 g/mole and/or preferably at least 70, more preferably at least 100, for example at least 150 g/mole.

Preferably, the molar ratio of the unsaturations in the crosslinking agent and the unsaturations in the unsaturated polyester resin may range between 9:1 and 1:9, preferably between 2:1 and 1:2. Preferably, equimolar amounts of unsaturations in the crosslinking agent and the unsaturated polyester resin are recommended.

Thermal Initiation System of the Composition

The thermal initiation system of the composition comprises at least a thermal radical initiator for example a peroxide (a), optionally a catalyst (in the literature is also known as accelerator) (b) for the thermal radical initiator, optionally an inhibitor (c) for the thermal radical initiator. Upon heating, the thermal radical initiator for example a peroxide, generates (free) radicals able to initiate radical crosslinking in the composition of the invention.

The thermal radical initiator may be based on labile C—C bonds like in benzpinacol, may be based on azo compounds, like in azoisobutyronitrile or may be based on peroxides, such as for instance hydroperoxides, perethers, peresters percarbonates, monopercarbonates, dipercarbonates, perketals and peranhydrides.

Preferably, the thermal initiator system comprises a peroxide which is chosen from the group of peresters and monopercarbonates according to formula (I) and peranhydrides of formula (II) and any combination of peroxides according to formula (I) and formula (II).

a. Peroxide

The composition of the invention comprises at least a thermal radical initiator; said thermal radical initiator is a peroxide which is chosen from the group of peresters and monopercarbonates according to formula (I)

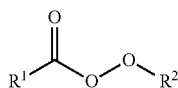
(I)

wherein $R^1$ represents an optionally substituted $C_{1-20}$ alkyl, a $C_{6-20}$ aryl or $OR^5$, wherein $R^5$ represents an optionally substituted $C_{1-20}$ alkyl or an optionally substituted $C_{6-20}$ aryl; $R^2$ represents an optionally substituted $C_{1-20}$ alkyl or an optionally substituted $C_{6-20}$ aryl;

and peranhydrides of formula (II)

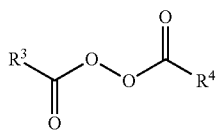
(II)

wherein $R^3$ and $R^4$ each independently represent an optionally substituted $C_{1-20}$ alkyl, a $C_{6-20}$ aryl or $OR^6$, wherein $R^6$ represents an optionally substituted $C_{1-10}$ alkyl or a $C_{6-20}$ aryl; and any combination of peroxides according to formula (I) and formula (II).

Preferably $R^2$ in formula (I) represents tert-butyl.

Examples of peresters and monopercarbonates according to formula (I) include peresters, for example tert-butyl peroxybenzoate (Trigonox C), tert-butyl peroxyacetate (Trigonox F-050), tert-amyl peroxybenzoate (Trigonox 127), tert-amyl peroxyacetate (Trigonox 133-CK60), tert-butyl-2-ethylhexanoate (Trigonox 21S), tert-butylperoxydiethylacetate (Trigonox 27), di-tert-butylperoxypivalate (Trigonox 25-C75), tert-butyl peroxyneoheptanoate (Trigonox 257-C75), cumylperoxyneodecanoate (Trigonox 99-C75), 2-ethylhexyl perlaurate or mixtures thereof; and monopercarbonates, for example tert-butyl peroxy-2-ethylhexylcarbonate (Trigonox 117), tert-butyl peroxyisopropylcarbonate (Trigonox BPIC75), tert-amylperoxy-2-ethylhexylcarbonate (Trigonox 131) and mixtures thereof.

As "the peroxide" is understood herein the peroxide chosen from the group of peresters and monopercarbonates according to formula (I) and peranhydrides of formula (II) and/or any combination of peroxides according to formula (I) and formula (II) thereof. The peroxides of formulae (I) and (II) and the perethers, hydroperoxides, perketals and dipercarbonates are thermal radical initiators.

Preferably, a perester is used, for example tert-butyl peresters, for example tert-butyl peroxybenzoate (Trigonox C) [$R^1$ represents phenyl and $R^2$ represents t-butyl in formula (I)].

Examples of peranhydrides of formula (II) include for example dibenzoylperoxide, dilauroylperoxide, didecanoylperoxide (Perkadox SE-10), di(3,5,5-trimethylhexanoyl)peroxide (Trigonox 36-C75) and mixtures thereof. It should be noted that Trigonox, and Perkadox are trademarks of Akzo Nobel.

Preferably, as a peranhydride dibenzoylperoxide ($R^3$ and $R^4$ in formula (II) both represent phenyl) or dilauroylperoxide ($R^3$ and $R^4$ in formula (II) both represent undecane) is present in the composition of the invention.

The terms 'optional substituent' and/or 'optionally substituted' as used herein (unless followed by a list of other substituents) signifies one or more of an 'organic group'. The term 'organic substituent' as used herein denotes any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur. Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The composition of the invention may comprise also other thermal radical initiators besides the peresters and/or monopercarbonates of formula (I) and/or peranhydrides of formula (II), such as for example perethers, hydroperoxides, perketals, dipercarbonates or azo compounds.

Preferably the peroxide is chosen from the group of peresters and monopercarbonates according to formula (I) and peranhydrides of formula (II) and/or and/or any combination of peroxides according to formula (I) and formula (II) thereof.

More preferably the peroxide is chosen from the group of peranhydrides of formula (II).

The amount of peroxide in the composition of the invention is at least 0.5, preferably at least 0.6, more preferably at least 0.65, even more preferably at least 0.8, most preferably at least 0.9, especially 1, more especially at least 1.2, even more especially at least 1.5, most especially at least 2 wt % on the total amount of resins. The amount of peroxide is preferably less than 10, more preferably less than 8, even more preferably less than 7, most preferably less than 6 wt % on total amount of resins and crosslinking agent.

An alternative method to calculate the amount of peroxide in the composition of the invention is based on the weight of peroxide calculated on the total weight of resins and crosslinking agent normalized to 100 parts of resins and crosslinking agent. According to this method, the amount of peroxide is at least 0.5, preferably at least 0.6, more preferably at least 0.65, even more preferably at least 0.8, most preferably at least 0.9, especially 1, more especially at least 1.2, even more especially at least 1.5, most especially at least 2 pph. The amount of peroxide is preferably less than 10, more preferably less than 8, even more preferably less than 7, most preferably less than 6 pph.

b. Catalyst (Accelerator)

The composition of the invention may also comprise a catalyst also indicated herein as accelerator, for the thermal radical initiator for example the peroxide. An accelerator may for example be a transition metal compound.

Therefore, the invention also relates to a composition of the invention of the invention, wherein the initiation system comprises a peroxide according to formula (I) and a transition metal compound.

The accelerator may be chosen from the group of transition metal compounds of transition metals with atomic numbers from/equal to 21 and up to/equal to 79. In chemistry and physics, the atomic number (also known as the proton number) is the number of protons found in the nucleus of an atom. It is traditionally represented by the symbol Z. The atomic number uniquely identifies a chemical element. In an atom of neutral charge, the atomic number is equal to the number of electrons. Examples of suitable transition metal compounds are those of the following transition metals Sc, Ti, V, Cr, Mn, Fe, Co, Ni, Cu, Zn, Mo, W, etc., preferably Mn, Fe, Co or Cu.

The transition metal compounds are preferably chosen from the group of transition metal salts or complexes or mixtures thereof, preferably from the group of organic metal salts or complexes, most preferably organic acid metal salts or derivatives thereof, for example transition metal carboxylates or transition metal acetoacetates, for example transition metal ethylhexanoate. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt.

The optimal amount of transition metal catalyst is dependent on the choice of transition metal catalyst and of the peroxide, but can easily be determined by the person skilled in the art through routine experimentation. Generally, the amount of transition metal catalyst may be chosen in the range of from 0.00001 to 25 mmol transition metal catalyst/kg total amount of resins.

The amount of thermal radical initiator for example the amount of the peroxide and the catalyst for the thermal radical initiator used, is preferably chosen such that when the composition of the invention cures to an acceptable degree at low temperatures.

c. Inhibitor

The composition of the invention may further comprise an inhibitor for the peroxide and any other thermal radical initiator optionally present in the composition of the invention.

Examples of inhibitors are preferably chosen from the group of phenolic compounds, stable radicals, catechols, phenothiazines, hydroquinones, benzoquinones or mixtures thereof.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1 oxyl 2,2,6,6 tetramethylpiperidine, 1 oxyl 2,2,6,6-tetramethylpiperidine 4 of (a compound also referred to as TEMPOL), 1 oxyl 2,2,6,6-tetramethylpiperidine 4 one (a compound also referred to as TEMPON), 1 oxyl 2,2,6,6 tetramethyl 4 carboxyl piperidine (a compound also referred to as 4 carboxy TEMPO), 1 oxyl 2,2,5,5 tetramethylpyrrolidine, 1 oxyl 2,2,5,5 tetramethyl 3-carboxylpyrrolidine (also called 3 carboxy PROXYL) and galvinoxyl (2,6-di-tert-butyl-α-(3,5-di-tert-butyl-4-oxo-2,5-cyclohexadien-1-ylidene)-p-tolyloxy).

Examples of catechols include catechol, 4-t-butylcatechol, and 3,5-di-t-butylcatechol.

Examples of hydroquinones include hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

It is also possible to use a mixture of (the above mentioned) inhibitors. Preferably as an inhibitor hydroquinones or catechols are used, depending on the choice of (type and amount of) transition metal compound, more preferably the inhibitor is a hydroquinone.

In another embodiment, the invention provides for a composition of the invention, wherein the inhibitor is a hydroquinone.

1 k and/or 2 k Compositions

The compositions of the invention may be a one component system, but may also be a two component system. Preferably, the composition of the invention is one component system.

With a 'one component system', also called a 1K system, is meant that all (reactive) components of the powder coating composition form part of one powder. In a two component system, also called 2K system, a powder coating composition is composed of at least two different powders with different chemical compositions, which keeps the reactive components physically separated. The at least two different powders may be mixed in a physical blend before the composition of the invention is put in the storage container or may be mixed just before applying the 2K system to a substrate to let a curing reaction take place. The compositions of the at least two different powders in the 2K system are usually selected such that each powder contains an ingredient which is needed for curing but is absent from the other powder(s). This separation allows preparation of the individual powder composition in a heated state (such as by melt mixing) without the initiation of the cure reaction.

The composition of the invention may optionally comprise the usual additives, such as for example waxes, pigments, fillers degassing agents, flow (smoothness) agents, appearance enhancing agents or (light) stabilizers. It should be noted that none of these usual additives are considered to be transition metal compounds. The pigments may be inorganic or organic. Suitable inorganic pigments include for example, titanium dioxide, zinc sulphide, zinc phosphate, mica, iron oxide and for chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Examples of flow agents include Byk™ 361 N. Other additives, such as additives for improving tribo-chargeability may also be added.

Nucleating agents may also be present in the composition of the invention in order to facilitate the crystallization of the crystalline component in the blend.

Any feature or preferred combination of features or preferred combination of ranges disclosed in the invention and regard the composition of the invention for example resins, blends of resins, thermal initiation system, crosslinking agent, can be combined.

Methods of: a) Preparation of the Composition of the Invention and b) Coating a Substrate with a Composition of the Invention A common way to prepare a powder coating composition is to mix the separately weighed-out components in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Therefore the invention also relates to a process for the preparation of a heat-curable powder coating composition as defined herein comprising the steps of:
 mixing the components of the heat-curable powder coating composition to obtain a premix;
 heating the premix, preferably in an extruder, to obtain an extrudate;
 cooling down the extrudate to obtain a solidified extrudate; and
 grinding the solidified extrudate into smaller particles to obtain the heat-curable powder coating composition.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the composition of the invention in the extruder.

In another aspect, the invention relates to a process for coating a substrate comprising the steps of:
 a. applying a heat-curable powder coating composition as defined herein, to a substrate;
 b. heating the substrate.

The composition of the invention may be applied using the techniques known to the person skilled in the art, for example using electrostatic spray or electrostatic fluidized bed or flame spray.

Heating of the coated substrate may be done using conventional methods, such as with a convection oven and/or with an (N)IR lamp. Even microwave equipment may be used to heat the substrate.

The time during which the composition of the invention is at least partially cured is preferably below 60 minutes and usually above 1 minute in case a convection oven is used to heat the coating. More preferably, the curing time is below 40 minutes, even more preferably is at most 30 minutes, most preferably is at most 20 minutes, especially is at most 10 minutes.

The temperature, at which the composition of the invention is cured, is preferably in the range of 60 to 225° C., more preferably in the range 60 to 130° C., even more preferably 80 to 120° C. Preferably, the curing temperature is lower than 130° C., more preferably lower than 120° C., even more preferably lower than 110° C., most preferably lower than 100° C., most preferably lower than 95° C. Preferably, the curing temperature is at least 65° C., more preferably 70° C., even more preferably at least 75° C.

For example, the curing time and curing temperature of a composition of the invention may be 20 minutes at 130° C., preferably 10 minutes at 130° C.

Other Embodiments and Aspects of the Invention

In another aspect, the invention relates to the use of a composition according to the invention to coat a substrate or an article.

In another aspect, the invention relates to the use of a composition according to the invention to fully or partially coat a substrate.

In another embodiment the invention relates to the use of a composition of the invention to coat a heat-sensitive substrate, preferably wood for example low density fibre board, medium density fibreboard and high density fibreboard, plastic, etc., or combinations thereof.

In another aspect, the invention relates to a substrate that is fully or partially coated with the composition of the invention.

In another aspect, the invention relates to a substrate that is fully or partially coated with a coating prepared from the composition of the invention.

In one embodiment of the invention the substrate is a non heat-sensitive substrate, for example glass, ceramic, fibre cement board, or metal, for example aluminum, copper or steel, preferably metal.

In another embodiment of the invention, the substrate is a heat-sensitive substrate.

In yet another embodiment, the invention provides for a use of the composition of the invention to coat a heat-sensitive substrate and/or a non heat-sensitive substrate.

In yet another embodiment, the invention provides for a use of the composition of the invention to coat a substrate wherein the substrate is a heat-sensitive substrate, for example wood or plastic or wherein the substrate is a non-heat sensitive substrate, for example metal.

Heat-sensitive substrates include plastic substrates, wood substrates, for example solid wood, such as for example: hard wood, soft wood, plywood; veneer, particle board, low density fibre board, medium density fibreboard and high density fibreboard, OSB (Oriented Strand Board) wood laminates, chipboard and other substrate in which wood is a important constituent, such as for example foil covered wooden substrates, engineered wood, plastic modified wood, plastic substrates or wood plastic compounds (WPC); substrates with cellulosic fibres, for example cardboard or paper substrates; textile and leather substrates. Examples of plastic substrates include unsaturated polyester resin based compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS.

Other heat-sensitive substrates include objects that are a combination of a metal substrate with a heat-sensitive part, such as plastic hosing, heavy metal parts, strips, for example aluminium frames with heat strips etc.

Other substrates that are particularly suitable for coating with the powder coating of the invention are those where a low temperature cure is desired for efficient production, such as heavy metal parts.

Specific wood coating markets where the composition of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where the composition of the invention may be used include automotive applications, such as interior car parts, wheel covers, bumpers, under the hood parts etc, flexible flooring, sporting goods, cosmetics, audio-visual applications, such as TV sets, computer housing, phones, etc., household appliances and satellite dishes.

In another embodiment, the invention provides for a composition comprising a (semi)crystalline component and an amorphous component and a thermal initiation system, wherein at least the (semi)crystalline component or the amorphous component comprises a polyester having di-acid based reactive unsaturations, wherein the (semi)crystalline component comprises a co-crosslinker having reactive unsaturations which are reactable with the di-acid based reactive unsaturations of the polyester, wherein the amount of (semi)crystalline component is at least 17.5 wt % based on the total amount of polymers having an Mn of at least 2,200 Da and co-crosslinker, wherein the thermal initiation system comprises a thermal radical initiator.

In a further embodiment, the invention provides for a composition according to the invention, wherein thermal radical initiator is a peroxide which is chosen from the group of peresters and monopercarbonates according to formula (I)

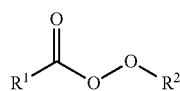
(I)

wherein $R^1$ represents an optionally substituted $C_{1-20}$ alkyl, a $C_{6-20}$ aryl or $OR^5$, wherein $R^5$ represents an optionally substituted $C_{1-20}$ alkyl or an optionally substituted $C_{6-20}$ aryl; $R^2$ represents an optionally substituted $C_{1-20}$ alkyl or an optionally substituted $C_{6-20}$aryl; and peranhydrides of formula (II)

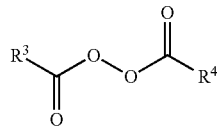
(II)

wherein $R^3$ and $R^4$ each independently represent an optionally substituted $C_{1-20}$ alkyl, a $C_{6-20}$ aryl or $OR^6$, wherein $R^6$ represents an optionally substituted $C_{1-10}$ alkyl or a $C_{6-20}$ aryl and mixtures thereof.

In another embodiment, the invention provides for a composition according to the invention, wherein the di-acid based reactive unsaturation is a fumaric acid based unsaturation.

In another embodiment, the invention provides for a composition comprising a (semi)crystalline resin and an amorphous resin, wherein at least the (semi)crystalline or the amorphous resin comprises a polyester having di-acid based, for example fumaric acid based unsaturations and wherein the amount of (semi)crystalline resin is at least 6 wt % based on the total amount of crystalline and amorphous resin and wherein both the (semi)crystalline resin and the amorphous resin have an Mn of at least 2,200 Da.

In yet another embodiment, the invention provides for a composition comprising a (semi)crystalline polymer and an amorphous component and a thermal initiation system, wherein at least the (semi)crystalline polymer or the amorphous component comprises a polyester having di-acid based reactive unsaturations, wherein the amorphous component comprises a co-crosslinker having reactive unsaturations which are reactable with the di-acid based reactive unsaturations of the polyester, wherein the amount of (semi)crystalline polymer is at least 6 wt % based on the total amount of polymers having an Mn of at least 2,200 Da and the co-crosslinker, wherein the thermal initiation system comprises a thermal radical initiator.

In a further embodiment, the invention provides for a composition according to the invention wherein thermal radical initiator is a peroxide which is chosen from the group of peresters and monopercarbonates according to formula (I)

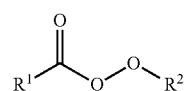
(I)

wherein $R^1$ represents an optionally substituted $C_{1-20}$ alkyl, a $C_{6-20}$ aryl or $OR^5$, wherein $R^5$ represents an optionally substituted $C_{1-20}$ alkyl or an optionally substituted $C_{6-20}$ aryl; $R^2$ represents an optionally substituted $C_{1-20}$ alkyl or an optionally substituted $C_{6-20}$ aryl; and peranhydrides of formula (II)

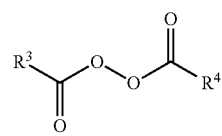
(II)

wherein $R^3$ and $R^4$ each independently represent an optionally substituted $C_{1-20}$ alkyl, a $C_{6-20}$ aryl or $OR^6$, wherein $R^6$ represents an optionally substituted $C_{1-10}$ alkyl or a $C_{6-20}$ aryl and mixtures thereof.

In another embodiment the invention relates to a composition comprising a (semi)crystalline resin and an amorphous resin, wherein at least the (semi)crystalline or the amorphous resin comprises a polyester having di-acid based, for example fumaric acid based unsaturations and wherein the amount of (semi)crystalline resin is at least 6 wt % based on the total amount of crystalline and amorphous resin and wherein both the (semi)crystalline resin and the amorphous resin have an Mn of at least 2,200 Da. In this composition, the amount of crystalline resin is at least 6 wt %, preferably at least 7 wt %. for example at least 8 wt %, for example at least 9 wt %, for example at least 10 wt %, preferably at least 15 wt %, preferably at least 17.5 wt %, preferably at least 19 wt % and/or preferably at most 90 wt %, for example at most 80 wt % based on the total amount of crystalline and amorphous resin having an Mn of at least 2,200 Da.

Many other variations embodiments of the invention will be apparent to those skilled in the art and such variations are contemplated within the broad scope of the present invention.

All embodiments disclosed herein may be combined with each other and/or with preferred elements of the present invention.

Further aspects of the invention and preferred features thereof are given in the claims herein.

The invention will now be described in detail with reference to the following non limiting examples which are by way of illustration only.

EXAMPLES

In the Examples section, the abbreviation PE represents polyester resin, the abbreviation "AMOR" represents amorphous, the abbreviation "CRYST" represents crystalline, the abbreviation "CrystXlinkAgent" represents a crystalline crosslinking agent, the abbreviation "AmXlinkAgent" represents an amorphous crosslinking agent, the abbreviation PCC represents powder coating composition and the abbreviation PC represents powder coating.

In the Examples section the abbreviation "Comp" denotes a Comparative Example of either a powder coating composition e.g. CompPCC1, or a powder coating e.g. CompPC1.

In Table 3, the abbreviation "n.p.g" denotes herein "not possible to grind and/or to sieve".

In Table 3, the abbreviation "n.m." denotes herein "not measured".

Analytical Methods and Techniques for the Measurement of the Properties of the Polyester Resins and the Crosslinking Agents Used in the Heat-Curable Powder Coating Compositions The glass transition temperature ($T_g$) (inflection point), of the crystallization temperature ($T_c$), the melting temperature ($T_m$) and the melting enthalphy ($\Delta H_m$) were measured via Differential Scanning calorimetry (DSC) on a Mettler Toledo, TA DSC821 apparatus, in $N_2$ atmosphere as described herein after: A sample of 10 mg was placed in the DSC apparatus. The sample was brought to 25° C. In the first heating curve, the sample was heated to 150° C. with a heating rate of 5° C./min. The sample was kept at 150° C. for 1 min. The sample was subsequently cooled to −50° C. with a cooling rate of 5° C./min, resulting in a cooling curve. After reaching −50° C. the sample was immediately heated to 150° C. with a heating rate of 5° C./min, affording a second heating curve. The $T_g$ was measured from the cooling curve (150° C. to −50° C., cooling rate 5° C./min) whereas the Tg, $T_m$ and $\Delta H_m$ were determined from the second heating curve (−50° C. to 150° C., heating rate of 5° C./min).

Unless otherwise stated the theoretical number average molecular weight ($M_n$) is defined as follows:

$$M_n = (\Sigma_i N_i M_i)/(\Sigma_i N_i)$$

where $N_i$ is the number of molecules of molecular weight $M_i$.

The $M_n$ is calculated (theoretical value) by multiplying the targeted functionality (f) with 56110 and dividing the outcome thereof by the sum of the targeted acid value (AV) (mg KOH/g of the polyester) and the targeted hydroxyl value (OHV) (mg KOH/g of the polyester) according to the following equation:

$$M_n = (56110 \times f)/(AV+OHV)$$

The Mn can also be measured (measured Mn), for example by determining the molecular weight (Mn) in tetrahydrofurane using GPC according to ISO 13885-1 employing polystyrene standards and appropriate columns designed for the determination of the molecular weights.

Viscosity measurements were carried out at 160° C., on a Rheometric Scientific CT 5 (Rm 265) apparatus (Mettler Toledo). A 30 mm spindle was used. The applied shear-rate was 70 s$^{-1}$.

The acid and hydroxyl values of the polyester resins were determined titrimetrically according to ISO 2114-2000 and ISO 4629-1978, respectively or were determined theoretically.

The weight per ethylenic unsaturation was determined via $^1$H-NMR on a 300 MHz Varian NMR-spectrometer using pyrazine as internal standard (measured WPU). Recorded spectra were analyzed in full with ACD software and peak areas of all peaks were calculated.

The weight resin per mole unsaturation was calculated with the following formula:

$$WPU = \left[ \frac{W_{pyr}}{W_{resin}} \frac{1}{MW_{pyr}} \frac{A_{c=c}/N_{c=c}}{A_{pyr}/N_{pyr}} \right]^{-1}$$

$W_{pyr}$ and $W_{resin}$ are weights pyrazine (is internal standard) and resin, respectively, expressed in the same units. $MW_{pyr}$ is molecular weight pyrazine (=80 gr/mole). $A_{C=C}$ is the peak area for hydrogens attached to the carbon carbon double bonds of the reactive unsaturations (C=C component) in the resin; $N_{C=C}$ is the number of hydrogens of that particular C=C component. $A_{pyr}$ is the peak area for pyrazine and $N_{pyr}$ is the number of hydrogens (=4).

Methods for the Measurement of Properties of the Powder Coatings Derived Upon Heat-Curing of the Heat-Curable Powder Coating Compositions Prepared Herein.

The properties of the powder coatings corresponding to the heat-curable compositions CompPCC1-CompPCC6, PCC1-PCC2 and PCC20-PCC25 presented in Table 3 were measured on panels cured for 20 minutes.

The properties of the powder coatings corresponding to the heat-curable compositions CompPCC7-CompPCC8, PCC3-PCC19 and PCC26-PCC29 presented in Table 3 were measured on panels cured for 10 minutes.

The minimum depth (mm) of indentation to cause failure [commonly known also as Erichsen Slow Penetration (ESP)] was determined according to ISO 1520:2006 (Cupping Test, especially §7.3) 24 hours after curing the panels with the heat-curable powder coating compositions as described herein. The minimum depth of indentation to cause failure was determined for coated panels cured at 130° C. ISO 1520:2006 specifies an empirical test procedure for assessing the resistance of a coating to cracking and/or detachment from a metal substrate when subjected to gradual deformation by indentation under standard conditions. The method was carried out by gradually increasing the depth of indentation to determine the minimum depth (mm) at which the coating cracks and/or becomes detached from the substrate. The maximum of two valid measurements of the minimum depth of indentation to cause failure was reported.

Acetone double rubs (ADR) were carried out as described herein to determine the curing. For the purpose of the invention with one acetone double rub (ADR) is meant one back and forward movement over the surface of a coating having a thickness of approximately 60 μm using a cotton cloth drenched in acetone, which cotton cloth covers a hammer head having a weight of 980 gram and a contact surface area with the coating of 2 cm$^2$. Every 20 rubs the cloth is drenched in acetone. The measurement is continued until either the coating is removed (and the obtained ADR number and curing temperature are noted down) or until 100 ADR are reached. In the context of the invention, the measurement was carried out on panels cured at various curing temperatures for example at curing temperatures in the range of 80-180° C. with an increment of 10° C. The lower curing temperature at which 100 ADR were reached was reported herein. In certain cases, the coating was completely removed at the tested curing temperatures; therefore no specific temperature was reported. In the context of the invention, by "cure to an acceptable degree at low temperatures" is meant that the powder coating when cured at most 130° C. for at most 20 minutes, is able to resist at least 100 acetone double rubs (ADR). The curing temperature (in ° C.) at which the powder coating composition can withstand at least 100 ADR was reported (temperature for 100 ADR).

Smoothness (or commonly known also as flow) of powder coatings derived upon full cure of the corresponding heat-curable powder coating compositions was determined by comparing the smoothness of the coating with PCI Powder Coating Smoothness panels (ACT Test Panels Inc., APR22163 (A) Batch: 50708816) at a thickness of approximately 60 μm. The rating of smoothness is from 1 to 10, with 1 representing the roughest coating and 10 representing the smoothest coating. For the heat-curable powder coating compositions of the invention, their corresponding powder coatings had smoothness equal or higher to 2, more preferably equal or higher to 3, even more preferably equal or higher to 4, most preferably equal or higher to 5, are desirable.

The adhesion was determined using a cross-cut test (Gitterschnitt) in accordance with ISO 2409 (edition 3, dated 15 May 2007) at 130° C. The degree of adhesion of the coating onto the substrate was classified with a scale from G0 to G5; with G0: cross-cut area was not affected (excellent adhesion); G1 means that the affected cross-cut area is significantly greater than 5%; G2 means that the affected cross-cut area is significantly greater than 5% but not significantly greater than 15%; G3 means that the affected cross-cut area is significantly greater than 15% but not significantly greater than 35%; G4 means that the affected cross-cut area is significantly greater than 35% but not significantly greater than 65%; G5 means any degree of flaking that cannot even be classified by classification G4 (very poor adhesion). For the heat-curable powder coating compositions of the invention, their corresponding powder coatings presenting adhesion ranging from G0 to G2. More preferred powder coatings have adhesion ranging from G0 to G1.

The coating thickness was measured by a PosiTector 6000 coating thickness gage from DeFelsko Corporation.

Unsaturated Polyester Resins

The monomers used for the preparation of the unsaturated polyester resins are presented in Table 1. Table 1 presents also the properties of the prepared unsaturated polyester resins.

Synthesis of Amorphous Polyester Resins Having Di-Acid Ethylenic Unsaturations (PE1-PE5)

Polyester Resins PE 1, PE2 and PE3

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 205° C. When an acid value of less than approximately 15 mg KOH/g resin was reached, the third stage of the polyester preparation was carried out under reduced pressure at 205° C. till an acid value of approximately 5 mg KOH/g resin was reached. The acid value of the resin was brought below 5 mg KOH/g resin via reaction of the remaining acid-groups of the resin with 2,3-epoxy propyl neodecanoate (PE2 and PE3) or ethylene carbonate (PE1). The used amount was dependent on the acid value before addition. Subsequently, the polyester was discharged onto an aluminum foil kept at room temperature.

Polyester Resins PE4 and PE5

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 205° C. When an acid value of less than approximately 30 mg KOH/g resin was reached, the third stage of the polyester preparation was carried out under reduced pressure at 205° C. till an acid value of approximately 5 mg KOH/g resin was reached. The acid value of the resin was brought below 5 mg KOH/g resin via reaction of the remaining acid-groups of the resin with 2,3-epoxy propyl neodecanoate or ethylene carbonate. The used amount was dependent on the acid value before addition. Subsequently, the polyester was discharged onto an aluminum foil kept at room temperature.

Synthesis of Crystalline Polyester Resins Having Di-Acid Ethylenic Unsaturations (PE7-PE11)

The polyesters resins PE7, PE8, PE9, PE10 and PE11 were crystalline and had di-acid ethylenic unsaturation, the latter being 2-butenedioic acid ethylenic unsaturation.

Polyester Resins PE7, PE8, PE9, PE10 and PE11

A reaction vessel fitted with a thermometer, a stirrer and a distillation device, was filled with a tin catalyst and the monomers for the first step (all the alcohol and acids) as listed in Table 1. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 205° C. When an acid value of less than approximately 10 mg KOH/g resin was reached, the third stage of the polyester preparation was carried out under reduced pressure at 205° C. till an acid value of approximately 2 mg KOH/g resin was reached. Subsequently, the polyester was discharged onto an aluminum foil kept at room temperature.

Polyester Resin PE12

A reaction vessel fitted with a thermometer, a stirrer and a distillation device, was filled with a tin catalyst and the monomers for the first step (all the alcohol and acids) as listed in Table 1. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 205° C. When an acid value of less than approximately 10 mg KOH/g resin was reached, the third stage of the polyester preparation was carried out under reduced pressure at 205° C. till an acid value of approximately 2 mg KOH/g resin was reached. The acid value of the resin was brought below 5 mg KOH/g resin via reaction of the remaining acid-groups of the resin with 2,3-epoxy propyl neodecanoate. The used amount was dependent on the acid value before addition. Subsequently, the polyester was discharged onto an aluminum foil kept at room temperature.

Saturated Polyester Resin

Synthesis of Crystalline Polyester Resin Having No Ethylenic Unsaturation (PE6)

A reaction vessel fitted with a thermometer, a stirrer and a distillation device, was filled with a tin catalyst and the monomers for the first step (the alcohols and acids) as listed in Table 1. Stirring was then applied and a light nitrogen flow was passed over the reaction mixture while the temperature was raised to 200° C. When an acid value of less than approximately 10 mg KOH/g resin was reached, the reaction mixture was cooled to 180° C. The final stage of the polyester preparation was carried out under reduced pressure at 180° C. till an acid value of lower than 5 mg KOH/g resin was reached. Subsequently, the polyester was discharged onto an aluminum foil kept at room temperature.

Crosslinking Agents Used for the Preparation of the Heat-Curable Compositions Amorphous Crosslinking Agent (AmXlinkAgent)

A reaction vessel fitted with a thermometer, a stirrer and a distillation device, was filled with a tin catalyst and the monomers for the first step (hydrogenated bisphenol A (14.3 mol %), neopentylglycol (14.3 mol %), isophthalic acid (14.3 mol %). Stirring was then applied and a light nitrogen flow was passed over the reaction mixture while the temperature was raised to 220° C. Subsequently, for the second step hydroxyl butyl vinyl ether (28.5 mol %) and a tin catalyst were added at a temperature of 120° C. Subsequently, isophorone diisocyanate (28.5 mol %) was dosed such that the reaction mixture was kept below 120° C. during addition. After all isocyanate was dosed, the temperature was kept or set at 120° C. and maintained at this temperature for approximately half an hour. Next, n-butanol was added until all free NCO had reacted (measured using FT-IR). The temperature was kept at 120° C. and vacuum (0.1 bar) was applied to remove all volatiles. After vacuum the content of the vessel was discharged.

The AmXlinkAgent was an amorphous vinylether.
The properties of the AmXlinkAgent were:
$T_g$=43.8° C.; Theoretical WPU: 576 g/mol; Theoretical Mn: 1152 Da [this was calculated by adding up 1 mol of hydrogenated bisphenol A with 1 mol neopentylglycol (104.15 Da) with one mol of isophthalic acid (116.13 Da) with 2 mol of isophorone diisocyanate (222.29 Da) with 2 mol of hydroxy butyl vinyl ether (116.16 Da) minus 2 mol of water (18.02 Da)];

Crystalline Crosslinking Agent (CrystXlinkAgent)

URACROSS™ P3307 was used as a crystalline crosslinking agent. URACROSS™ P3307 is a crystalline vinylether. The properties of the URACROSS™ P3307 were:
$T_m$=90° C.; $T_c$=69° C.; ΔHm=140 J/g; Theoretical WPU=200 g/mol; Theoretical Mn=400 Da [this was calculated by adding up 1 monomer of hexanediisocyanate (168.20 Da) with 2 mol of hydroxyl butyl vinyl ether (116.16 Da)];

All the polyester resins PE1-PE12, AmXlinkAgent and CrystXlinkAgent were solid at room temperature and at atmospheric pressure.

Preparation of Heat-Curable Powder Coating Compositions: General Procedure

The compositions of the heat-curable powder coating compositions are presented in Table 3. The thermal radical initiators for example peroxides, the accelerators, the inhibitors and the pigments used for the preparation of the heat-curable powder coating compositions are presented in Table 2. Kronos® 2130 is titanium dioxide from Kronos Titan GmbH, Resiflow® PV-5 is a flow control agent from Worlée-Chemie GmbH.

The heat-curable compositions were prepared by mixing the components presented in Table 3. in a blender. Subsequently, the components were extruded in a PRISM TSE16 PC twin screw extruder at 60° C. with a screw speed of 200 rpm and a torque higher than 90%. The extrudate was allowed to cool to room temperature and broken into chips. These chips were then ground in an ultra-centrifugal mill at 18,000 rpm and sieved in a Retsch ZM100 sieve. The sieve fraction with particle size below 90 μm was collected and used for further experiments.

All heat-curable powder coating compositions prepared herein were solid at 23° C. and at atmospheric pressure.

Preparation of the Powder Coatings: General Procedure

The heat-curable powder coating compositions prepared herein were electrostatically sprayed (corona spray gun, 60 kV) onto ALQ test panels to a coating thickness upon curing of approximately 60 μm and cured at various temperatures ranging from 80 to 180° C. for either 10 or 20 minutes in an air-circulation oven (Heraeus Instruments UT6120) affording white colored powder coatings.

TABLE 1

Composition and characterization of polyester resins

| | Polyester resin | Polyester resin composition [monomer in mol %] | | | | | | | | | |
|---|---|---|---|---|---|---|---|---|---|---|---|
| | | Propylene glycol | Neopentyl-glycol | Ethylene glycol | 1,4-Butanediol | 1,6-Hexanediol | Trimethylol propane | Terephthalic acid | Sebacic acid | Dodecane-dioic acid | Fumaric acid |
| AMOR | PE1 | | 47.9 | | | | 3.7 | 37.5 | | | 10.9 |
| | PE2 | | 50.9 | | | | 0.4 | 34.5 | | | 14.2 |
| | PE3 | | 53.0 | | | | 0.4 | 31.9 | | | 14.8 |
| | PE4 | 50.7 | | | | | 0.4 | 35.4 | | | 13.6 |
| | PE5 | | 51.6 | | | | | 32.8 | | | 15.7 |
| CRYST | PE6 | | | | 51.7 | | | | 48.3 | | |
| | PE7 | | | | | 51.8 | | | | 29.1 | 19.1 |
| | PE8 | | | | | 50.7 | | | | 35.0 | 14.3 |
| | PE9 | | | 50.6 | | | | | | 38.0 | 11.5 |
| | PE10 | | | 51.5 | | | | | | 37.1 | 11.4 |
| | PE11 | | | | | 51.9 | | | | 34.2 | 13.9 |
| | PE12 | | | | 51.2 | | | | 44.5 | | 4.3 |

Polyester resin characterization

| | Polyester resin | Theoretical WPU | Theoretical Mn | Theoretical functionality (f) | Targeted hydroxyl value (mg KOH/g) | Targeted acid value (mg KOH/g) | Measured hydroxyl value (mg KOH/g) | Measured acid value (mg KOH/g) | Tg (° C.) | Tm (° C.) | Tc (° C.) | ΔHm (J/g) |
|---|---|---|---|---|---|---|---|---|---|---|---|---|
| AMOR | PE1 | 1028 | 2723 | 2.9 | 56.0 | 3.5 | 42.7 | 3.1 | 46.5 | | | |
| | PE2 | 805 | 2585 | 2.1 | 45.0 | 0.0 | 43.1 | 0.6 | 44.2 | | | |
| | PE3 | 799 | 2587 | 2.1 | 45.0 | 0.0 | 43.3 | 0.4 | 31.4 | | | |
| | PE4 | 725 | 3151 | 2.1 | 37.5 | 0.0 | 43.4 | 1.5 | 52.6 | | | |
| | PE5 | 700 | 2725 | 2.0 | 40.2 | 1.0 | 35.1 | 2.3 | 44.5 | | | |

TABLE 1-continued

Composition and characterization of polyester resins

| | | | | | | | | | | | | | |
|---|---|---|---|---|---|---|---|---|---|---|---|---|---|
| CRYST | PE6 | | 3741 | 2.0 | 30.0 | 0.0 | | | | | 60.9 | 48.1 | 103.2 |
| | PE7 | 700 | 3302 | 2.0 | 31.9 | 2.0 | 29.1 | 1.6 | | | 56.4 | 43.9 | 91.7 |
| | PE8 | 977 | 7226 | 2.0 | 9.1 | 2.0 | 13.7 | 1.8 | | | 62.0 | 48.8 | 99.6 |
| | PE9 | 1000 | 7500 | 2.0 | 12.9 | 2.0 | 9.7 | 1.7 | | | 70.9 | 49.9 | 66.0 |
| | PE10 | 1000 | 3305 | 2.0 | 31.9 | 2.0 | 22.1 | 1.5 | | | 67.2 | 50.1 | 73.4 |
| | PE11 | 1001 | 3304 | 2.0 | 31.9 | 2.0 | 38.8 | 0.5 | | | 62.6 | 47.3 | 104.7 |
| | PE12 | 2571 | 3768 | 2.0 | 29.6 | 0.0 | 32.2 | 1.2 | | −30.6 | 71.0 | 56.0 | 84.0 |

TABLE 2

Peroxides, accelerator, inhibitor, pigment and flow agent used for the preparation of the heat-curable powder coating compositions

| Chemical name | Structure | Commercial name | Description or use |
|---|---|---|---|
| Tert-butyl peroxy-benzoate | | Trigonox ™ C from Akzo Nobel | Thermal radical initiator (peroxide according to formula I) |
| Dilauroyl peroxide | | Laurox ™ S from Akzo Nobel | Thermal radical initiator (peroxide according to formula II) |
| Dibenzoyl peroxide (BPO) | | Luperox ™ A75 from Arkema | Thermal radical initiator (peroxide according to formula II) |
| Cobalt bis(2-ethyl hexanoate) | | COMMET ™ Cobalt Octoate from De Monchy International B.V. | Accelerator |
| Tert-butyl hydroquinone | | | Inhibitor |
| Kronos 2310 | | | Pigment |
| | | ResiFlow PV-5 | Flow agent |

TABLE 3

Composition of heat-curable powder coating compositions and properties of their corresponding powder coatings Composition of heat-curable powder coating composition

| Heat-curable powder coating composition | Amorphous polyester | Amount of amorphous polyester (g) | AmXlinkAgent (g) | CrystXlinkAgent (g) | Crystalline polyester | Amount of crystalline polyester (g) | wt % crystalline polyester on total amount of amorphous polyester, crystalline polyester and crosslinking agent | Dilauroyl peroxide (pph) | Dibenzoyl peroxide (pph) |
|---|---|---|---|---|---|---|---|---|---|
| CompPCC1 | PE1 | 236.8 | | 48.3 | | | 0.0 | | 3.3 |
| CompPCC2 | PE3 | 155.0 | | 37.5 | | | 0.0 | | 4.8 |
| CompPCC3 | PE2 | 150.0 | | 37.0 | | | 0.0 | | 4.9 |
| CompPCC4 | PE4 | 150.0 | | 42.2 | | | 0.0 | | 4.7 |
| CompPCC5 | PE4 | 100.0 | 91.0 | | | | 0.0 | | 4.9 |
| CompPCC6 | PE5 | 60.0 | 56.6 | | | | 0.0 | | 3.3 |

TABLE 3-continued

Composition of heat-curable powder coating compositions and properties of their corresponding powder coatings

| | | | | | | | | |
|---|---|---|---|---|---|---|---|---|
| PCC1 | PE4 | 94.5 | 88.4 | | PE12 | 10.5 | 5.4 | 4.9 |
| PCC2 | PE4 | 69.0 | 73.4 | | PE12 | 46.0 | 24.4 | 4.8 |
| PCC3 | PE5 | 54.2 | 56.6 | | PE7 | 5.8 | 5.0 | 3.3 |
| PCC4 | PE5 | 48.3 | 56.6 | | PE7 | 11.7 | 10.0 | 3.3 |
| PCC5 | PE5 | 36.7 | 56.6 | | PE7 | 23.3 | 20.0 | 3.3 |
| PCC6 | PE5 | 25.0 | 56.6 | | PE7 | 35.0 | 30.0 | 3.3 |
| PCC7 | PE5 | 13.4 | 56.6 | | PE7 | 46.6 | 40.0 | 3.3 |
| PCC8 | PE5 | 1.7 | 56.6 | | PE7 | 58.3 | 50.0 | 3.3 |
| CompPCC8 | PE5 | 0.0 | 56.6 | | PE7 | 60.0 | 51.5 | 3.3 |
| CompPCC7 | | | | 26.2 | PE7 | 90.0 | 77.45 | 3.3 |
| PCC10 | PE5 | 73.2 | | 26.2 | PE7 | 16.8 | 18.7 | 3.3 |
| PCC11 | PE5 | 63.9 | | 26.2 | PE7 | 26.1 | 29.0 | 3.3 |
| PCC12 | PE5 | 52.3 | | 26.2 | PE7 | 37.7 | 41.9 | 3.3 |
| PCC13 | PE1 | 150.0 | | 41.2 | PE8 | 50.0 | 20.8 | 2.4 |
| PCC14 | PE1 | 150.0 | | 40.8 | PE9 | 50.0 | 20.8 | 2.4 |
| PCC15 | PE1 | 120.0 | | 41.0 | PE8 | 80.0 | 33.2 | 2.4 |
| PCC16 | PE1 | 120.0 | | 40.8 | PE9 | 80.0 | 33.2 | 2.4 |
| PCC17 | PE1 | 120.0 | | 40.8 | PE10 | 80.0 | 33.2 | 2.4 |
| PCC18 | PE1 | 120.0 | | 40.8 | PE11 | 80.0 | 33.2 | 2.4 |
| PCC19 | PE1 | 142.1 | | 48.3 | PE11 | 94.8 | 33.2 | 3.2 |
| PCC20 | PE4 | 135.0 | | 39.0 | PE12 | 15.0 | 7.9 | 4.9 |
| PCC21 | PE3 | 116.3 | | 30.9 | PE12 | 38.8 | 20.8 | 4.8 |
| PCC22 | PE4 | 96.0 | | 31.6 | PE12 | 64.0 | 33.4 | 4.9 |
| PCC23 | PE1 | 152.2 | | 31.4 | PE6 | 101.5 | 35.6 | 3.2 |
| PCC24 | PE1 | 142.1 | | 48.3 | PE10 | 94.8 | 33.2 | 3.2 |
| PCC25 | PE1 | 142.1 | | 48.3 | PE11 | 94.8 | 33.2 | 3.2 |
| PCC26 | PE4 | 100.0 | 51.6 | | PE12 | 28.5 | 15.8 | |
| PCC27 | PE5 | 25.0 | 56.6 | | PE7 | 35.0 | 30.0 | 3.3 |
| PCC28 | PE1 | 120.0 | | 41.0 | PE8 | 80.0 | 33.2 | 2.4 |
| PCC29 | PE4 | 100.0 | 51.6 | | PE12 | 28.5 | 15.8 | |

| Heat-curable powder coating composition | Composition of heat-curable powder coating composition | | | | | Property of powder coating | | | |
|---|---|---|---|---|---|---|---|---|---|
| | Tert-butyl perbenzoate (pph) | Cobalt bis(2-ethyl hexanoate) (g) | Tert-butyl hydroquinone (g) | Kronos 2310 (g) | Resiflow PV5 (g) | Temperature (° C.) for 100 ADR | Minimum depth of identation to cause failure (mm) | Smoothness (PCI) | Adhesion (Glitterschnitt) |
| CompPCC1 | | | | | 5.7 | 120 | 4.2 | 2 | n.m. |
| CompPCC2 | | | | | 3.9 | 110 | 7.5 | 2 | n.m. |
| CompPCC3 | | | | | 3.7 | 110 | 7.5 | 2 | n.m. |
| CompPCC4 | | | | | 3.8 | 110 | 7.0 | 1 | n.m. |
| CompPCC5 | | | | | 3.8 | 120 | 0.1 | 1 | n m. |
| CompPCC6 | | | | 38.5 | 1.7 | >130 | 0.6 | 1 | G2 |
| PCC1 | | | | | 3.9 | 120 | 1.0 | 2 | n.m. |
| PCC2 | | | | | 3.8 | 120 | 7.5 | 2 | n.m. |
| PCC3 | | | | 38.5 | 1.7 | 130 | 0.8 | 2 | G1 |
| PCC4 | | | | 38.5 | 1.7 | 130 | 1.0 | 2 | G1 |
| PCC5 | | | | 38.5 | 1.7 | 130 | 1.4 | 2 | G1 |
| PCC6 | | | | 38.5 | 1.7 | 130 | 7.2 | 2 | G0 |
| PCC7 | | | | 38 5 | 1.7 | 130 | 6.8 | 4 | G0 |
| PCC8 | | | | 38.5 | 1.7 | 130 | 7.5 | 4 | G0 |
| CompPCC8 | | | | 38.5 | 1.7 | >130 | 7.6 | 5 | G0 |
| CompPCC7 | | | | 38.4 | 1.7 | n.p.g | n.p.g | n.p.g | n.p.g |
| PCC10 | | | | 38.4 | 1.7 | 120 | 6.0 | 5 | G1 |
| PCC11 | | | | 38.4 | 1.7 | 120 | 6.1 | 6 | G2 |
| PCC12 | | | | 38.4 | 1.7 | 120 | 5.6 | 6 | G2 |
| PCC13 | | | | 79.6 | 4.8 | 110 | 6.6 | 3 | n.m. |
| PCC14 | | | | 79.5 | 4.8 | 100 | 6.2 | 3 | n.m. |
| PCC15 | | | | 79.5 | 4.8 | 110 | 6.7 | 3 | n.m. |
| PCC16 | | | | 79.5 | 4.8 | 110 | 6.2 | 2 | n.m. |
| PCC17 | | | | 79.5 | 4.8 | 100 | 6.2 | 5 | n.m. |
| PCC18 | | | | 79.5 | 4.8 | 110 | 6.3 | 6 | n.m. |
| PCC19 | | | | | 5.7 | 120 | 7.3 | n.m. | n.m. |
| PCC20 | | | | | 3.8 | 110 | 7.5 | n.m. | n.m. |
| PCC21 | | | | | 3.7 | 110 | 7.5 | n.m. | n.m. |
| PCC22 | | | | | 3.8 | 110 | 7.5 | n.m. | n.m. |
| PCC23 | | | | | 5.7 | 120 | 6.8 | n.m. | n.m. |
| PCC24 | | | | | 5.7 | 120 | 7.3 | n.m. | n.m. |
| PCC25 | | | | | 5.7 | 120 | 7.3 | n.m. | n.m. |
| PCC26 | 1.5 | 0.7 | | 60.0 | 1.8 | 130 | 3.5 | 5 | G1 |
| PCC27 | | | 0.06 | 38.5 | 1.7 | 130 | 7.3 | 2 | G0 |
| PCC28 | | | 0.06 | 79.5 | 4.8 | 110 | 6.8 | n.m. | n.m. |
| PCC29 | 1.5 | 0.7 | 0.06 | 60.0 | 1.8 | 130 | 3.6 | 5 | G1 |

As can be seen from the Examples in Tables 3 in combination with the Examples in Table 1, only when a heat-curable powder coating compositions comprising:
  i) at least one crystalline polyester resin present in an amount of at most 90 wt %; and
  ii) at least one amorphous polyester resin; and
  iii) at least one crosslinking agent; and
  iv) at least one thermal radical initiator,
wherein,
  the at least one crystalline polyester resin and/or the at least one amorphous polyester resin has di-acid ethylenic unsaturations;
  the at least one crosslinking agent is either crystalline or amorphous;
  the at least one crosslinking agent has reactive unsaturations that are reactable with the ethylenic unsaturations of the di-acid ethylenic unsaturations of the at least one crystalline polyester resin and/or the at least one amorphous polyester resin to be crosslinked, said unsaturations of the crosslinking agent are different from the unsaturations of the at least one crystalline polyester resin and the unsaturations of the at least one amorphous polyester resin;
  the wt % is based on the total amount of i)+ii)+iii);
were used to form powder coatings, said compositions were cured to an acceptable degree at low temperature for example at most 130° C. for at most 20 minutes, said compositions were ground, sieved and extruded and said compositions upon heat cure formed powder coatings that also exhibited a good balance of properties between good flexibility, good smoothness and good adhesion. In addition, the compositions of the invention can suitably be used on heat- and/or non heat-sensitive, even if the composition is highly pigmented. This can be seen by comparing the comparative examples of Table 3 with the Examples according to the invention.

More particularly, it becomes evident that compositions comprising an amorphous unsaturated polyester resin with an amorphous crosslinking agent failed to provide compositions that were cured to an acceptable degree at low temperatures and also failed to form powder coatings exhibiting also a good balance of properties between good flexibility, good smoothness and good adhesion. The compositions of the invention addressed some or all of the problems identified herein. This can be seen by comparing the comparative examples of Table 3 with the Examples according to the invention. Moreover the compositions of the invention were surprisingly found to exhibit a balanced array of properties as described herein, both in cases where the crosslinking agent was amorphous (PCC1-PCC8 and PCC26, PCC27 and PCC29) or crystalline (PCC10-PCC25 and PCC28).

The invention claimed is:

1. A heat curable powder coating composition comprising:
  i) at least one crystalline polyester resin having a melting enthalpy of at least 40 J/g and a crystallization temperature which is lower than a melting temperature thereof and being at most 55° C. lower than the melting temperature thereof, said crystalline polyester resin being present in an amount of at most 90 wt %;
  ii) at least one amorphous polyester resin having a melting enthalpy lower than 40 J/g; wherein the at least one crystalline polyester resin and/or the at least one amorphous polyester resin has di-acid ethylenic unsaturations;
  iii) at least one crosslinking agent that is either crystalline having a melting enthalpy of at least 40 J/g or amorphous having a melting enthalpy lower than 40 J/g, said crosslinking agent having reactive unsaturations that are reactable with the ethylenic unsaturations of the di-acid ethylenic unsaturations of i) and/or ii) and said unsaturations of the crosslinking agent are different from the unsaturations of i) and ii); and
  iv) at least one thermal radical initiator in an amount of at least 0.5 pph, wherein
  the wt % is based on the total amount of i)+ii)+iii), and wherein the melting enthalpy, of the at least one crystalline polyester resin, the melting temperature of the at least one crystalline polyester resin, the melting enthalpy of the at least one amorphous polyester resin, and the melting enthalpy of the at least one crosslinking agent, is each measured via Differential Scanning calorimetry (DSC) at a heating rate of 5° C./min, and wherein the crystallization temperature of the at least one crystalline polyester resin is measured via DSC at a cooling rate of 5° C./min.

2. The heat curable powder coating composition according to claim 1, wherein the crystallization temperature of the crystalline polyester resin is at most 40° C. lower than its melting temperature.

3. The heat curable powder coating composition according to claim 2, wherein the at least one crystalline polyester resin has di-acid based unsaturations and a theoretical Mn of at most 5,000 Da.

4. The heat curable powder coating composition according to claim 2, wherein the at least one crystalline polyester resin is present in an amount of at least 6 wt % and of at most 90 wt %.

5. The heat curable powder coating composition according to claim 2, wherein the at least one crystalline polyester resin is present in an amount of at least 15 wt % and of at most 90 wt %.

6. The heat curable powder coating composition according to claim 2, wherein the at least one amorphous polyester resin has a glass transition temperature measured via DSC at a heating rate of 5° C./min, of at most 65° C.

7. The heat curable powder coating composition according to claim 2, wherein the at least one crystalline polyester resin and the at least one amorphous polyester resin have each di-acid ethylenic unsaturations and a hydroxyl value measured titrimetrically according to ISO 4629-1978, of at least 10 and of at most 70 mg KOH/g polyester.

8. The heat curable powder coating composition according to claim 2, wherein the at least one thermal radical initiator is present in an amount of less than 10 pph.

9. The heat curable powder coating composition according to claim 2, wherein the at least one crosslinking agent is present in an amount of at least 10 wt % and of at most 55 wt %.

10. The heat curable powder coating composition according to claim 2, wherein the at least one crosslinking agent is present in an amount of at least 16 wt % and of at most 55 wt %.

11. The heat curable powder coating composition according to claim 2, wherein the at least one crosslinking agent is present in an amount of at least 17.5 wt % and of at most 55 wt %.

12. The heat curable powder coating composition according to claim 2, wherein the at least one crosslinking agent is present in an amount of at least 17.5 wt % and of at most 55 wt % and wherein the at least one thermal radical initiator is present in an amount of less than 10 pph.

13. The heat curable powder coating composition according to claim 1, wherein the at least one crystalline polyester resin has di-acid based unsaturations and a theoretical Mn of at most 5,000 Da.

14. The heat curable powder coating composition according to claim 13, wherein the at least one crosslinking agent is crystalline and is present in an amount of at least 17.5 wt % and of at most 40 wt %.

15. The heat curable powder coating composition according to claim 13, wherein the at least one crosslinking agent is amorphous and is present in an amount of at least 30 wt % and of at most 55 wt %.

16. The heat curable powder coating composition according to claim 1, wherein the at least one crystalline polyester resin is present in an amount of at least 6 wt % and of at most 90 wt %.

17. The heat curable powder coating composition according to claim 1, wherein the at least one crystalline polyester resin is present in an amount of at least 15 wt % and of at most 90 wt %.

18. The heat curable powder coating composition according to claim 17, wherein the at least one crosslinking agent is crystalline and is present in an amount of at least 17.5 wt % and of at most 40 wt %.

19. The heat curable powder coating composition according to claim 17, wherein the at least one crosslinking agent is amorphous and is present in an amount of at least 30 wt % and of at most 55 wt %.

20. The heat curable powder coating composition according to claim 1, wherein the at least one amorphous polyester resin has a glass transition temperature measured via DSC at a heating rate of 5° C./min, of at most 65° C.

21. The heat curable powder coating composition according to claim 20, wherein the at least one crosslinking agent is crystalline and is present in an amount of at least 17.5 wt % and of at most 40 wt %.

22. The heat curable powder coating composition according to claim 20, wherein the at least one crosslinking agent is amorphous and is present in an amount of at least 30 wt % and of at most 55 wt %.

23. The heat curable powder coating composition according to claim 1, wherein the at least one crystalline polyester resin and the at least one amorphous polyester resin have each di-acid ethylenic unsaturations and a hydroxyl value measured titrimetrically according to ISO 4629-1978, of at least 10 and of at most 70 mg KOH/g polyester.

24. The heat curable powder coating composition according to claim 1, wherein the at least one thermal radical initiator is present in an amount of less than 10 pph.

25. The heat curable powder coating composition according to claim 24, wherein the at least one crosslinking agent is crystalline and is present in an amount of at least 17.5 wt % and of at most 40 wt %.

26. The heat curable powder coating composition according to claim 24, wherein the at least one crosslinking agent is amorphous and is present in an amount of at least 30 wt % and of at most 55 wt %.

27. The heat curable powder coating composition according to claim 1, wherein the at least one crystalline polyester resin has di-acid based unsaturations and a theoretical Mn of at most 5,000 Da, and it is present in an amount of at least 15 wt % and of at most 90 wt %.

28. The heat curable powder coating composition according to claim 27, wherein the at least one crosslinking agent is present in an amount of at least 10 wt % and of at most 55 wt %.

29. The heat curable powder coating composition according to claim 27, wherein the at least one crosslinking agent is present in an amount of at least 16 wt % and of at most 55 wt %.

30. The heat curable powder coating composition according to claim 27, wherein the at least one crosslinking agent is present in an amount of at least 17.5 wt % and of at most 55 wt %.

31. The heat curable powder coating composition according to claim 27, wherein the at least one crosslinking agent is crystalline and is present in an amount of at least 17.5 wt % and of at most 40 wt %.

32. The heat curable powder coating composition according to claim 31, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2,5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

33. The heat curable powder coating composition according to claim 31, wherein the at least one crosslinking agent is a vinylether or a vinylester.

34. A partially or fully cured form of the heat-curable powder coating composition according to claim 31.

35. The heat curable powder coating composition according to claim 27, wherein the at least one crosslinking agent is amorphous and is present in an amount of at least 30 wt % and of at most 55 wt %.

36. The heat curable powder coating composition according to claim 35, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2,5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

37. The heat curable powder coating composition according to claim 35, wherein the at least one crosslinking agent is a vinylether or a vinylester.

38. A partially or fully cured form of the heat-curable powder coating composition according to claim 35.

39. The heat curable powder coating composition according to claim 27, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2,5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

40. The heat curable powder coating composition according to claim 39, wherein the at least one crosslinking agent is a vinylether or a vinylester.

41. The heat curable powder coating composition according to claim 27, wherein the at least one crosslinking agent is a vinylether or a vinylester.

42. The heat curable powder coating composition according to claim 1, wherein the at least one crystalline polyester resin has di-acid based unsaturations and a theoretical Mn of at most 5,000 Da and it is present in an amount of at least 15 wt % and of at most 90 wt %, and wherein the at least one amorphous polyester resin has a glass transition temperature measured via DSC at a heating rate of 5° C./min, of at most 65° C.

43. The heat curable powder coating composition according to claim 42, wherein the at least one crosslinking agent is present in an amount of at least 10 wt % and of at most 55 wt %.

44. The heat curable powder coating composition according to claim 42, wherein the at least one crosslinking agent is present in an amount of at least 16 wt % and of at most 55 wt %.

45. The heat curable powder coating composition according to claim 42, wherein the at least one crosslinking agent is present in an amount of at least 17.5 wt % and of at most 55 wt %.

46. The heat curable powder coating composition according to claim 42, wherein the at least one crosslinking agent is crystalline and is present in an amount of at least 17.5 wt % and of at most 40 wt %.

47. The heat curable powder coating composition according to claim 46, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

48. The heat curable powder coating composition according to claim 42, wherein the at least one crosslinking agent is amorphous and is present in an amount of at least 30 wt % and of at most 55 wt %.

49. The heat curable powder coating composition according to claim 48, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

50. The heat curable powder coating composition according to claim 42, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

51. The heat curable powder coating composition according to claim 42, wherein the at least one crosslinking agent is a vinylether or a vinylester.

52. The heat curable powder coating composition according to claim 1, wherein the at least one crystalline polyester resin has di-acid based unsaturations and a theoretical Mn of at most 5,000 Da, and it is present in an amount of at least 15 wt % and of at most 90 wt % and wherein the at least one thermal radical initiator is present in an amount of less than 10 pph.

53. The heat curable powder coating composition according to claim 52, wherein the at least one crosslinking agent is present in an amount of at least 17.5 wt % and of at most 55 wt %.

54. The heat curable powder coating composition according to claim 52, wherein the at least one crosslinking agent is crystalline and is present in an amount of at least 17.5 wt % and of at most 40 wt %.

55. The heat curable powder coating composition according to claim 54, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

56. The heat curable powder coating composition according to claim 54, wherein the at least one crosslinking agent is a vinylether or a vinylester.

57. The heat curable powder coating composition according to claim 52, wherein the at least one crosslinking agent is amorphous and is present in an amount of at least 30 wt % and of at most 55 wt %.

58. The heat curable powder coating composition according to claim 57, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

59. The heat curable powder coating composition according to claim 57, wherein the at least one crosslinking agent is a vinylether or a vinylester.

60. The heat curable powder coating composition according to claim 52, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

61. The heat curable powder coating composition according to claim 60, wherein the at least one crosslinking agent is a vinylether or a vinylester.

62. The heat curable powder coating composition according to claim 52, wherein the at least one crosslinking agent is a vinylether or a vinylester.

63. The heat curable powder coating composition according to claim 1, wherein the at least one crystalline polyester resin has di-acid based unsaturations and a theoretical Mn of at most 5,000 Da and it is present in an amount of at least 15 wt % and of at most 90 wt %, and wherein the at least one amorphous polyester resin has a glass transition temperature measured via DSC at a heating rate of 5° C./min, of at most 65° C., and wherein the at least one thermal radical initiator is present in an amount of less than 10 pph.

64. The heat curable powder coating composition according to claim 63, wherein the at least one crosslinking agent is present in an amount of at least 17.5 wt % and of at most 55 wt %.

65. The heat curable powder coating composition according to claim 63, wherein the at least one crosslinking agent is crystalline and is present in an amount of at least 17.5 wt % and of at most 40 wt %.

66. The heat curable powder coating composition according to claim 65, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

67. The heat curable powder coating composition according to claim 65, wherein the at least one crosslinking agent is a vinylether or a vinylester.

68. The heat curable powder coating composition according to claim 63, wherein the at least one crosslinking agent is amorphous and is present in an amount of at least 30 wt % and of at most 55 wt %.

69. The heat curable powder coating composition according to claim 68, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

70. The heat curable powder coating composition according to claim 68, wherein the at least one crosslinking agent is a vinylether or a vinylester.

71. The heat curable powder coating composition according to claim 63, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

72. The heat curable powder coating composition according to claim 71, wherein the at least one crosslinking agent is a vinylether or a vinylester.

73. The heat curable powder coating composition according to claim 63, wherein the at least one crosslinking agent is a vinylether or a vinylester.

74. The heat curable powder coating composition according to claim 1, wherein the at least one crosslinking agent is present in an amount of at least 10 wt % and of at most 55 wt %.

75. The heat curable powder coating composition according to claim 1, wherein the at least one crosslinking agent is present in an amount of at least 16 wt % and of at most 55 wt %.

76. The heat curable powder coating composition according to claim 1, wherein the at least one crosslinking agent is present in an amount of at least 17.5 wt % and of at most 55 wt %.

77. The heat curable powder coating composition according to claim 1, wherein the at least one crosslinking agent is present in an amount of at least 17.5 wt % and of at most 55 wt % and wherein the at least one thermal radical initiator is present in an amount of less than 10 pph.

78. The heat curable powder coating composition according to claim 1, wherein the at least one crosslinking agent is crystalline and is present in an amount of at least 17.5 wt % and of at most 40 wt %.

79. The heat curable powder coating composition according to claim 1, wherein the at least one crosslinking agent is amorphous and is present in an amount of at least 30 wt % and of at most 55 wt %.

80. The heat curable powder coating composition according to claim 1, wherein the composition further comprises at least one inhibitor selected from the group consisting of phenolic compounds, catechols, phenothiazines, hydroquinones, benzoquinones, 1 oxyl 2,2,6,6 tetramethylpiperidine, 1 oxyl 2,2,6,6-tetramethylpiperidine 4 ol, 1 oxyl 2,2,6,6-tetramethylpiperidine 4 one, 1 oxyl 2,2,6,6 tetramethyl 4 carboxyl piperidine, 1 oxyl 2,2,5,5 tetramethylpyrrolidine, 1 oxyl 2,2, 5,5 tetramethyl 3-carboxylpyrrolidine, and 2,6-di-tert-butyl-α-(3,5-di-tert-butyl-4-oxo-2,5-cyclohexadien-1-ylidene)-p-tolyloxy.

81. The heat curable powder coating composition according to claim 1, wherein the at least one crosslinking agent is a vinylether or a vinylester.

82. The heat curable powder coating composition according to claim 1, wherein the thermal radical initiator is a peroxide chosen from the group of peresters and monopercarbonates according to formula (I)

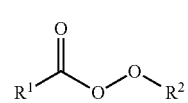

(I)

wherein
R$^1$ represents an optionally substituted C$_{1-20}$ alkyl, an optionally substituted C$_{6-20}$ aryl or OR$^5$, wherein R$^5$ represents an optionally substituted C$_{1-20}$ alkyl or an optionally substituted C$_{6-20}$ aryl; and
R$^2$ represents an optionally substituted C$_{1-20}$ alkyl or an optionally substituted C$_{6-20}$ aryl; and
peranhydrides of formula (II)

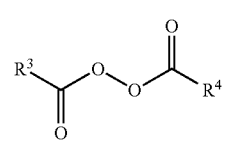

(II)

wherein
R$^3$ and R$^4$ each independently represent an optionally substituted C$_{1-20}$ alkyl, an optionally substituted C$_{6-20}$ aryl or OR$^6$, wherein R$^6$ represents an optionally substituted C$_{1-10}$ alkyl or a C$_{6-20}$ aryl; and
any combination of peroxides according to formula (I) and formula (II) thereof.

83. The heat curable powder coating composition according to claim 82, wherein the at least one crosslinking agent is present in an amount of at least 17.5 wt % and of at most 55 wt %.

84. The heat curable powder coating composition according to claim 82, wherein the at least one crosslinking agent is present in an amount of at least 17.5 wt % and of at most 55 wt % and wherein the at least one thermal radical initiator is present in an amount of less than 10 pph.

85. A process for the preparation of a heat-curable powder coating composition as defined in claim 1 comprising the steps of:
   (a) mixing the components of the heat-curable powder coating composition to obtain a premix;
   (b) heating the premix in an extruder to obtain an extrudate;
   (c) cooling down the extrudate to obtain a solidified extrudate; and
   (d) grinding the solidified extrudate into smaller particles to obtain the heat-curable powder coating composition.

86. A process for coating a substrate comprising the steps of:
   (a) applying a heat-curable powder coating composition as defined in claim 1 to a substrate; and
   (b) heating the substrate.

87. A substrate that is fully or partially coated with the heat-curable powder coating composition according to claim 1.

88. A partially or fully cured form of the heat-curable powder coating composition according to claim 1.

* * * * *